(12) United States Patent
Li et al.

(10) Patent No.: US 10,496,382 B2
(45) Date of Patent: Dec. 3, 2019

(54) MACHINE GENERATION OF CONTEXT-FREE GRAMMAR FOR INTENT DEDUCTION

(71) Applicant: MIDEA GROUP CO., LTD., Foshan (CN)

(72) Inventors: Baojie Li, Santa Clara, CA (US); Haisong Gu, Cupertino, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 56 days.

(21) Appl. No.: 15/902,911

(22) Filed: Feb. 22, 2018

(65) Prior Publication Data

US 2019/0258461 A1    Aug. 22, 2019

(51) Int. Cl.
*G06F 8/41*      (2018.01)
*G06F 17/27*     (2006.01)
(Continued)

(52) U.S. Cl.
CPC ............... *G06F 8/41* (2013.01); *G06F 8/425* (2013.01); *G06F 8/427* (2013.01); *G06F 8/433* (2013.01); *G06F 17/248* (2013.01); *G06F 17/271* (2013.01); *G06F 17/278* (2013.01); *G06N 5/00* (2013.01); *G06N 5/025* (2013.01)

(58) Field of Classification Search
None
See application file for complete search history.

(56) References Cited

U.S. PATENT DOCUMENTS 5,995,918 A *  11/1999  Kendall ............... G06F 17/271
                                                   379/88.01
8,515,734 B2 *  8/2013  Shu .................... G06F 17/2775
                                                       704/9
(Continued)

FOREIGN PATENT DOCUMENTS

CN    101281745 A    10/2008
CN    106023995 A    10/2016

OTHER PUBLICATIONS

Midea Group Co., Ltd., International Search Report and Written Opinion, PCT/CN2018/117297, dated Feb. 26, 2019, 7 pgs.

*Primary Examiner* — Francisco J Aponte
*Assistant Examiner* — Mark A Gooray
(74) *Attorney, Agent, or Firm* — Morgan, Lewis & Bockius LLP

(57) ABSTRACT

A method for generating context-free grammar for intent deduction includes: retrieving, through a compiler, a first template file for a respective actionable intent corresponding to a first task that is to be performed by a machine; parsing the first template file, using the compiler, to identify a first nonterminal variable that refers to a first nonterminal file containing a plurality of first named entity values; and generating, based on a plurality of production rules specified in the first template file, including at least a first production rule that includes the first nonterminal variable, first context-free grammar for the respective actionable intent corresponding to the first task, wherein generating the first context-free grammar for the respective actionable intent corresponding to the first task includes rewriting the first production rule by replacing the first nonterminal variable in the first production rule with the plurality of first named entity values.

17 Claims, 9 Drawing Sheets

(51) Int. Cl.
*G06F 17/24* (2006.01)
*G06N 5/00* (2006.01)
*G06N 5/02* (2006.01)

(56) References Cited

U.S. PATENT DOCUMENTS

| | | | |
|---|---|---|---|
| 2002/0156616 A1* | 10/2002 | Russell | G06F 17/2765 704/4 |
| 2003/0121026 A1* | 6/2003 | Wang | G06F 17/271 717/124 |
| 2007/0239453 A1 | 10/2007 | Paek et al. | |
| 2011/0307252 A1 | 12/2011 | Ju et al. | |
| 2018/0329987 A1* | 11/2018 | Tata | G06F 17/271 |

\* cited by examiner

MACHINE GENERATION OF CONTEXT-FREE GRAMMAR FOR INTENT DEDUCTION

TECHNICAL FIELD

This disclosure relates generally to machine generation of context free grammar (CFG) for intent deduction, and more specifically, to a method and system for generating context-free grammar for intent deduction in a home control setting.

BACKGROUND

Recently, voice-based digital assistants, such as Apple's SIRI, Amazon's Echo, Google's Google Assistant, and Microsoft's Cortana, have been introduced into the marketplace to handle various tasks such as home appliance controls, web search, calendaring, reminders, etc. To initiate the voice-based assistant, users can press a button or select an icon on a touch screen, or speak a trigger phrase (e.g., a predefined wake-up command), and then utter a natural language command describing his/her intent.

State of the art natural language processing techniques rely on natural language processing models that are difficult to implement and update, due to the high computation and personnel cost. In addition, lack of sufficient training samples is another reason that the natural language processing models become obsolete and inaccurate. Thus, it would be beneficial to provide a way to improve the implementation and updating of natural language processing models in the context of home appliance control and other similar applications.

SUMMARY

In the home appliance control setting, the intent of the user can be ascertained using natural language processing on the utterance of the user. However, there are many functions and specific settings for different appliances. Creating the natural language processing models for these different functions and settings, including generating context-free grammar for distinguishing intents related to the different functions and settings, is tedious and time consuming. Furthermore, as the functions and settings become increasingly complex and varied, manually writing out the context-free grammar for the different intents become increasingly untenable and error-prone. Sometimes, when new words, new models, and new functions are introduced in the market, the natural language processing models may be out-of-date, and updating the natural language processing model to quickly adapt to the changes in the real-world demands a lot of time and resources.

Additionally, training natural language processing models, including speech-to-text models, require a large number of language samples, but given the many settings and functions that need to be encompassed by the natural language processing models, collecting such large number of language samples is a difficult task. Without sufficient number of language samples to train the language models, the language models will fail to produce actionable intent, or the intent recognition accuracy is low. Furthermore, as new functions and settings become available, and as new appliances come onto the market, the existing natural language processing models may not be equipped with the vocabulary and tools to recognize intent related to these new functions and settings. Gathering new language samples from users to extend the existing language processing models to cover these new functions and settings is difficult, as users will less likely to use these new commands before users are assured through actual usage success that the natural language processing models could handle these new commands.

In some cases, when there are multiple users in a household, and/or when there are multiple appliances of the same type in the same household, the state-of-the-art natural language processing techniques do not effectively disambiguate between the intents and instructions uttered by different users and directed to different appliances of the same type. Although context information, such as current location of the user, and previous behavior of the user, may be used to help discern the user's intent, usage of context information require additional capabilities and compromise of user privacy, and may not produce accurate results in many cases. Sometimes, interactive questions and answers between the digital assistant and the user may help disambiguate the user's intent, but such interaction is time-consuming and cumbersome, and is computationally expensive.

In light of the many issues and problems with conventional ways of implementing and updating natural language processing models, including generating context-free grammar for different intents, and training natural language processing models based on language samples, the present disclosure describes a method and system for machine-generation of context-free grammar based on a context-free grammar template and corresponding nonterminal files, which is simple, modular, and extensible. The modular machine-generation of context-free grammar makes debugging process more straightforward.

The embodiments described below provide systems and methods for machine-generation of context-free grammar for intent deduction. In some embodiments, the method includes: retrieving, through a compiler, a first template file for a respective actionable intent corresponding to a first task that is to be performed by a machine; parsing the first template file, using the compiler, to identify a first nonterminal variable that refers to a first nonterminal file containing a plurality of first named entity values; and generating, based on a plurality of production rules specified in the first template file, including at least a first production rule that includes the first nonterminal variable, first context-free grammar for the respective actionable intent corresponding to the first task, wherein generating the first context-free grammar for the respective actionable intent corresponding to the first task includes rewriting the first production rule by replacing the first nonterminal variable in the first production rule with the plurality of first named entity values.

In accordance with some embodiments, a computer-readable storage medium (e.g., a non-transitory computer readable storage medium) is provided, the computer-readable storage medium storing one or more programs for execution by one or more processors of an electronic device, the one or more programs including instructions for performing any of the methods described herein.

In accordance with some embodiments, an electronic device (e.g., a portable electronic device) is provided that comprises means for performing any of the methods described herein.

In accordance with some embodiments, an electronic device (e.g., a portable electronic device) is provided that comprises one or more processors and memory storing one or more programs for execution by the one or more processors, the one or more programs including instructions for performing any of the methods described herein.

In accordance with some embodiments, an information processing apparatus for use in an electronic device is provided, the information processing apparatus comprising means for performing any of the methods described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5A-5C are block diagrams illustrating an example process for generating context-free grammar for actionable intents for two example tasks that can be performed by a machine, in accordance with some embodiments.

Like reference numerals refer to corresponding parts throughout the drawings.

DESCRIPTION OF EMBODIMENTS

Figure 1:
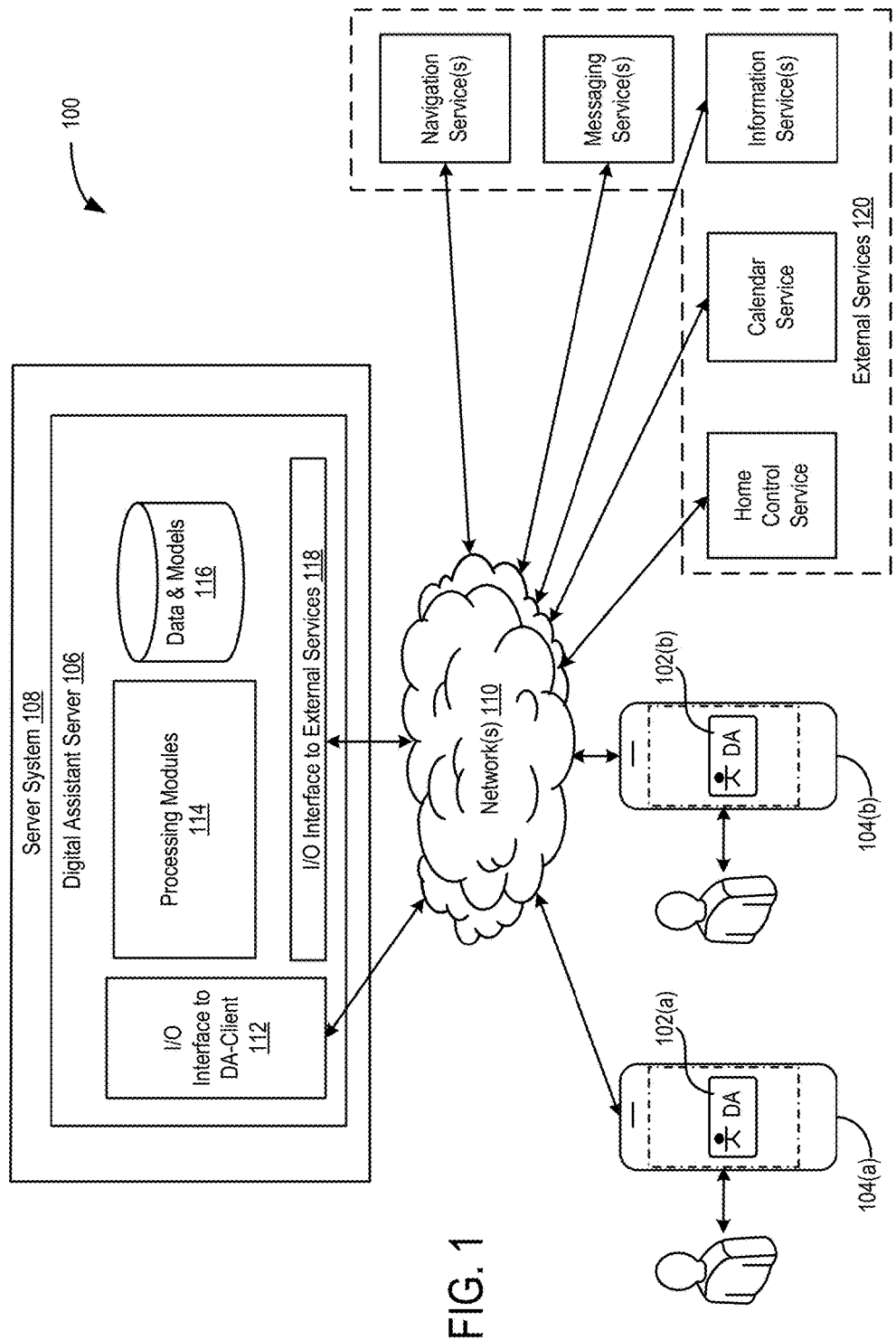
FIG. 1 is a block diagram illustrating an environment in which a digital assistant operates in accordance with some embodiments.

The embodiments described below provide systems and methods for automatic machine generation of context-free grammar for intent deduction based on voice commands (e.g., voice commands for controlling one or more functions of a home appliance). The systems and methods allow context-free grammar to be quickly developed and updated for new functions and settings of an appliance, enabling control for multiple home devices the same type by using different names for the multiple home devices, and enabling user-customizable control of a home device in a multi-user environment, etc.

In some embodiments, the voice commands are processed through a voice-based assistant. The voice-based assistant is optionally initiated using a voice trigger (e.g., Hey, assistant.) at an electronic device. Interactions with a voice-based digital assistant (or other speech-based services, such as a speech-to-text transcription service) can also begin when a user presses an affordance (e.g., a button or icon) on a device in order to activate the digital assistant. The digital assistant can be coupled to one or more other devices (e.g., home appliances, smart home devices, etc.) to control functions of these devices.

In a home control setting, multiple devices may be controlled via the digital home assistant. In general, intent deduction and named entity recognition in the user's speech input can be conducted either simultaneously or sequentially. In latter case, the transcribed text corresponding to the speech input is input to intent classifiers (e.g., ontology 360 in FIGS. 3A-3B) to determine which task the user wishes to be performed by the digital home assistant. In some embodiments, the natural language processing module of the digital home assistant locates the named entity recognition model of the recognized intent, and passes the text version of the user's speech input to it to obtain the recognized named entities in the input. Performance of intent classifiers relies much on the literal text. For example, if a text contains words 'air-conditioner' and 'temperature', then the intent would be most possibly 'ac_set_temperature'. In some scenarios, other names, such as model-specific names (e.g., "GE CS-252"), or nicknames (e.g., "Slinky") that are given to the appliances by the user can be added to the named entity list and processed by the named entity recognition model to recognize the user's intent. As disclosed herein, the context-free grammar that is used for the intent deduction needs to be updated to have the capability of understanding voice commands that uses these model-specific names and/or nicknames. In according to the machine-automatic generation of context-free grammar as disclosed herein, the update can be performed quickly and easily, such that the length and awkward user-facilitated disambiguation process can be avoided (e.g., forcing the user to say the AC in the baby's room, etc.). In addition, as disclosed herein, if there are multiple devices of the same type and model in the same household, different nicknames can be given to the different devices, such that the devices can be identified using the context-free grammar that has been generated to include rules to understand and process each of these different nicknames in the context of a voice command for using the devices. The ease by which the context-free grammar can be enriched and revised with these new nicknames and functions in accordance with the method and system described herein all the user to pick any name for their appliances, and the names do not have to be tied to the actual functions of the devices. For example, a user can give a unique alias, such like 'dog' for the living room air-conditioner, and 'cat' for bedroom air-conditioner, and the intent deduction can still be carried out with good accuracy. Enabling use of these unique alias names avoid the issues with other solutions, and each user can choose aliases that make sense to him/herself and the intent deduction is much more effective and efficient once the aliases are provided to the digital assistant during the device registration stage. In addition, each user can have their user-specific names for the same device. The machine generation of context-free grammar as disclosed herein allows different user-specific context-free grammar to be generated easily, so once speaker-recognition is performed, there is no extra burden to process the user's speech input just because the user has a different set of terms and names for a given intent.

FIG. 1 is a block diagram of an operating environment 100 of a digital home assistant according to some embodiments. The terms "home assistant", "digital assistant," "virtual assistant," "intelligent automated assistant," "voice-based digital assistant," "voice assistant", or "automatic digital assistant," refer to any information processing system that interprets natural language input in spoken and/or textual form to deduce user intent (e.g., identify a task type that corresponds to the natural language input), and performs actions based on the deduced user intent (e.g., perform a task corresponding to the identified task type). For example, to act on a deduced user intent, the system can perform one or more of the following: identifying a task flow with steps and parameters designed to accomplish the deduced user intent (e.g., identifying a task type), inputting specific requirements from the deduced user intent into the task flow, executing the task flow by invoking programs, methods, services, APIs, or the like (e.g., sending a request to a service provider); and generating output responses to the user in an audible (e.g., speech) and/or visual form.

Specifically, once initiated, a home assistant system is capable of accepting a user request at least partially in the form of a natural language command, request, statement, narrative, and/or inquiry. Typically, the user request seeks either an informational answer or performance of a task by the home assistant system. A satisfactory response to the user request is generally either provision of the requested informational answer, performance of the requested task, or a combination of the two. For example, a user may ask the digital assistant system a question, such as "What is the temperature in the room right now?" Based on the user's current location, and the ambient temperature, the digital assistant may answer, "The room temperature is 80 degrees." The user may also request the performance of a task, for example, by stating, "Please turn on the air conditioner." In response, the home assistant may acknowledge the request by generating a voice output, "Yes, right away," and then proceed to turn on the air conditioner in the room through a predefined control API of the air conditioner. There are numerous other ways of interacting with a home assistant to request information or performance of various tasks. In addition to providing verbal responses and taking programmed actions, the home assistant can also provide responses in other visual or audio forms (e.g., as text, alerts, music, videos, animations, etc.).

As shown in FIG. 1, in some embodiments, a digital assistant system is implemented according to a client-server model. The digital assistant system includes a client-side portion (e.g., 102 a and 102 b) (hereafter "digital assistant (DA) client 102") executed on a user device (e.g., 104 a and 104 b), and a server-side portion 106 (hereafter "digital assistant (DA) server 106") executed on a server system 108. The DA client 102 communicates with the DA server 106 through one or more networks 110. The DA client 102 provides client-side functionalities such as user-facing input and output processing and communications with the DA server 106. The DA server 106 provides server-side functionalities for any number of DA clients 102 each residing on a respective user device 104 (also called a client device or electronic device).

In some embodiments, the DA server 106 includes a client-facing I/O interface 112, one or more processing modules 114, data and models 116, and an I/O interface to external services 118. The client-facing I/O interface facilitates the client-facing input and output processing for the digital assistant server 106. The one or more processing modules 114 utilize the data and models 116 to determine the user's intent based on natural language input and perform task execution based on the deduced user intent. In some embodiments, the DA server 106 communicates with external services 120 (e.g., navigation service(s), messaging service(s), information service(s), calendar services, home appliance control service(s), etc.) through the network(s) 110 for task completion or information acquisition. The I/O interface to the external services 118 facilitates such communications.

Examples of the user device 104 include, but are not limited to, a home control center device, a handheld computer, a personal digital assistant (PDA), a tablet computer, a laptop computer, a desktop computer, a cellular telephone, a smartphone, an enhanced general packet radio service (EGPRS) mobile phone, a media player, a navigation device, a game console, a television, a remote control, or a combination of any two or more of these data processing devices or any other suitable data processing devices. More details on the user device 104 are provided in reference to an exemplary user device 104 shown in FIG. 2.

Examples of the communication network(s) 110 include local area networks (LAN) and wide area networks (WAN), e.g., the Internet. The communication network(s) 110 may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

The server system 108 can be implemented on at least one data processing apparatus and/or a distributed network of computers. In some embodiments, the server system 108 also employs various virtual devices and/or services of third party service providers (e.g., third-party cloud service providers) to provide the underlying computing resources and/or infrastructure resources of the server system 108.

Although the digital assistant system shown in FIG. 1 includes both a client side portion (e.g., the DA client 102) and a server-side portion (e.g., the DA server 106), in some embodiments, a digital assistant system refers only to the server-side portion (e.g., the DA server 106). In some embodiments, the functions of a digital assistant can be implemented as a standalone application installed on a user device. In addition, the divisions of functionalities between the client and server portions of the digital assistant can vary in different embodiments. For example, in some embodiments, the DA client 102 is a thin-client that provides only user-facing input and output processing functions, and delegates all other functionalities of the digital assistant to the DA server 106. In some other embodiments, the DA client 102 is configured to perform or assist one or more functions of the DA server 106.

Figure 2:
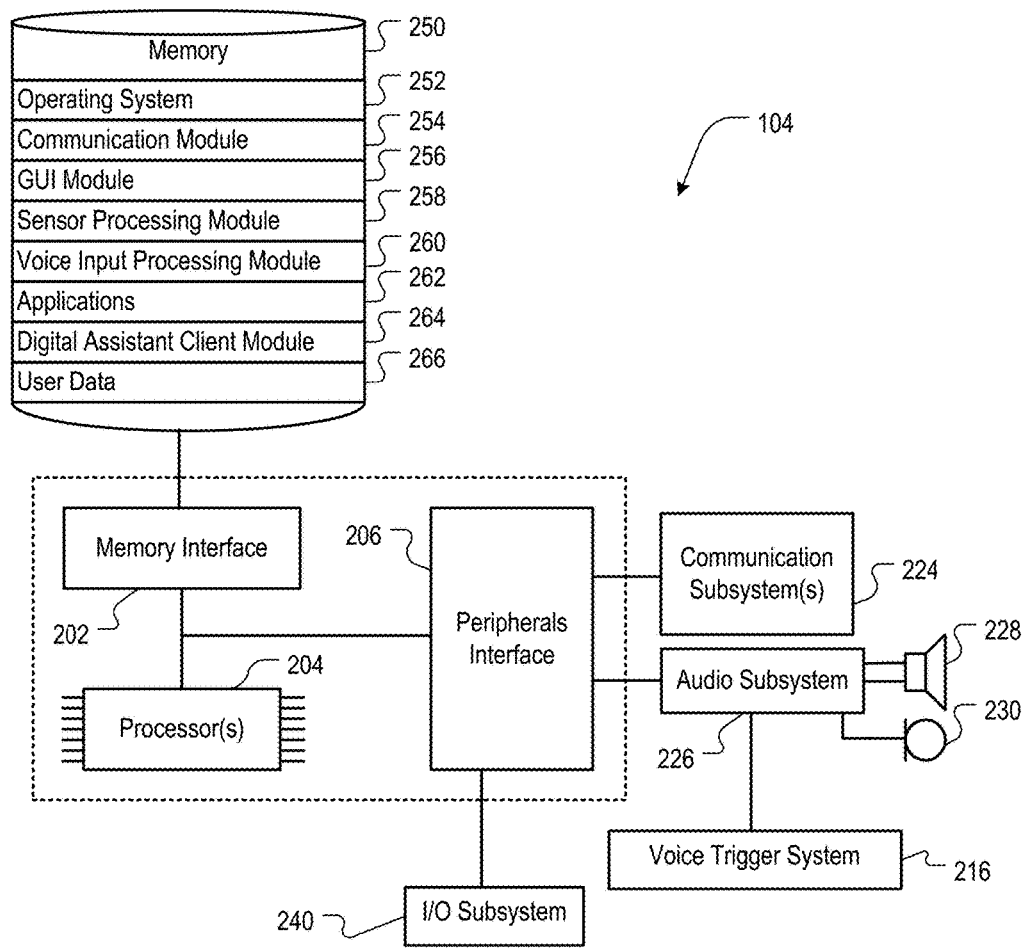
FIG. 2 is a block diagram illustrating a digital assistant client system in accordance with some embodiments.

FIG. 2 is a block diagram of a user device 104 in accordance with some embodiments. The user device 104 includes a memory interface 202, one or more processors 204, and a peripherals interface 206. The various components in the user device 104 are coupled by one or more communication buses or signal lines. The user device 104 includes various sensors, subsystems, and peripheral devices that are coupled to the peripherals interface 206. The sensors, subsystems, and peripheral devices gather information and/or facilitate various functionalities of the user device 104.

In some embodiments, the user device 104 includes one or more wired and/or wireless communication subsystems 224 provide communication functions. The communication subsystems 224 typically includes various communication ports, radio frequency receivers and transmitters, and/or optical (e.g., infrared) receivers and transmitters.

In some embodiments, the user device 104 includes an audio subsystem 226 coupled to one or more speakers 228 and one or more microphones 230 to facilitate voice-enabled functions, such as voice recognition, voice replication, digital recording, and telephony functions. In some embodiments, the audio subsystem 226 is coupled to a voice trigger system 216. In some embodiments, the voice trigger system 216 and/or the audio subsystem 226 includes low-power audio circuitry and/or programs (i.e., including hardware and/or software) for receiving and/or analyzing sound inputs, including, for example, one or more analog-to-digital converters, digital signal processors (DSPs), sound detectors, memory buffers, codecs, and the like. In some embodiments, the low-power audio circuitry (alone or in addition to other components of the user device 104) provides voice (or sound) trigger functionality for one or more aspects of the user device 104, such as a voice-based digital assistant or other speech-based service. In some embodiments, the low-power audio circuitry provides voice trigger functionality even when other components of the user device 104 are shut down and/or in a standby mode, such as the processor(s) 204, I/O subsystem 240, memory 250, and the like. In some embodiments, the voice trigger system 216 interfaces or includes a speaker recognition system that facilitates speaker-specific voice trigger functionality for the digital assistant.

In some embodiments, an I/O subsystem 240 is also coupled to the peripheral interface 206. The I/O subsystem 240 includes input and output controllers for various input and output devices, such as touch-screen displays, touchpad, keyboard, infrared port, USB port, and/or a pointer device such as a stylus.

The memory interface 202 is coupled to memory 250. In some embodiments, memory 250 includes a non-transitory computer readable medium, such as high-speed random access memory and/or non-volatile memory (e.g., one or more magnetic disk storage devices, one or more flash memory devices, one or more optical storage devices, and/or other non-volatile solid-state memory devices).

In some embodiments, memory 250 stores an operating system 252, a communications module 254, a graphical user interface module 256, a sensor processing module 258, a voice input processing module 260, applications 262, and a subset or superset thereof. The operating system 252 includes instructions for handling basic system services and for performing hardware dependent tasks. The communications module 254 facilitates communicating with one or more additional devices, one or more computers and/or one or more servers. The graphical user interface module 256 facilitates graphic user interface processing. The sensor processing module 258 facilitates sensor-related processing and functions (e.g., processing voice input received with the one or more microphones 228). The voice-input processing module 260 facilitates voice input processing processes and functions. The application module 262 facilitates various functionalities of user applications, such as electronic-messaging, web browsing, media processing, navigation, home appliance control and/or other processes and functions. In some embodiments, the user device 104 stores in memory 250 one or more software applications each associated with at least one of the external service providers.

As described above, in some embodiments, memory 250 also stores client-side digital assistant instructions (e.g., in a digital assistant client module 264) and various user data 266 (e.g., user speech samples, user voice prints, user-specific vocabulary data, preference data, and/or other data such as the user's electronic address book or contact list, to-do lists, shopping lists, user's preferences for home appliances, etc.) to provide the client-side functionalities of the digital assistant.

In various embodiments, the digital assistant client module 264 is capable of accepting voice input, text input, touch input, and/or gestural input through various user interfaces (e.g., the I/O subsystem 244) of the user device 104. The digital assistant client module 264 is also capable of providing output in audio, visual, and/or tactile forms. For example, output can be provided as voice, sound, alerts, text messages, menus, graphics, videos, animations, vibrations, and/or combinations of two or more of the above. During operation, the digital assistant client module 264 communicates with the digital assistant server (e.g., the digital assistant server 106, FIG. 1) using the communication subsystems 224.

In some embodiments, the digital assistant client module 264 utilizes various sensors, subsystems and peripheral devices to gather additional information from the surrounding environment of the user device 104 to establish a context associated with a user input. In some embodiments, the digital assistant client module 264 provides the context information or a subset thereof with the user input to the digital assistant server (e.g., the digital assistant server 106, FIG. 1) to help deduce the user's intent.

In some embodiments, memory 250 may include additional instructions or fewer instructions. Furthermore, various functions of the user device 104 may be implemented in hardware and/or in firmware, including in one or more signal processing and/or application specific integrated circuits, and the user device 104, thus, need not include all modules and applications illustrated in FIG. 2.

Figure 3A:
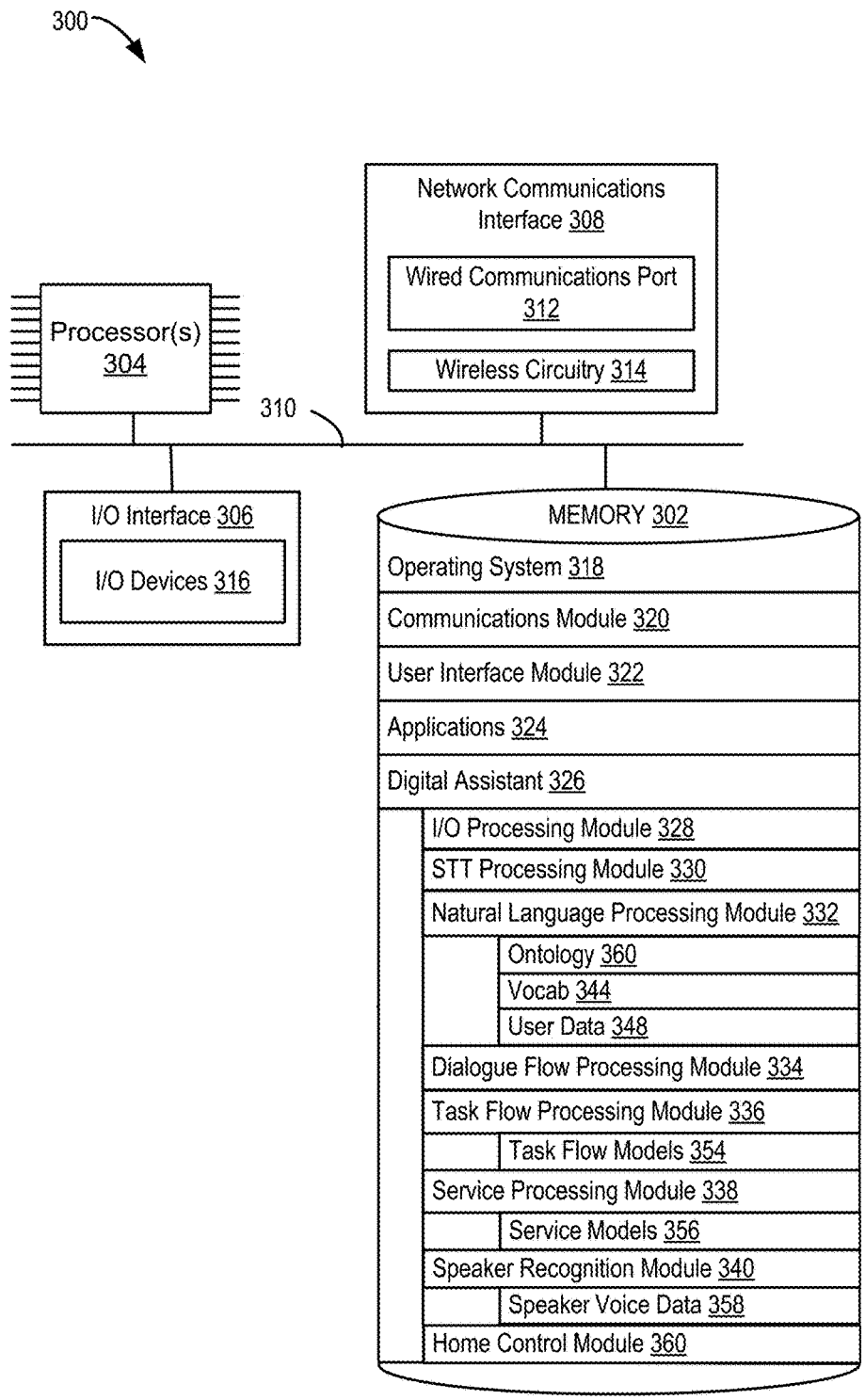
FIG. 3A is a block diagram illustrating a standalone digital assistant system or a digital assistant server system in accordance with some embodiments.

FIG. 3A is a block diagram of an exemplary home assistant system 300 (also referred to as the digital assistant) in accordance with some embodiments. In some embodiments, the home assistant system 300 is implemented on a standalone computer system. In some embodiments, the home assistant system 300 is distributed across multiple computers. In some embodiments, some of the modules and functions of the home assistant are divided into a server portion and a client portion, where the client portion resides on a user device (e.g., the user device 104) and communicates with the server portion (e.g., the server system 108) through one or more networks, e.g., as shown in FIG. 1. In some embodiments, the home assistant system 300 is an embodiment of the server system 108 (and/or the home assistant server 106) shown in FIG. 1. In some embodiments, the home assistant system 300 is implemented in a user device (e.g., the user device 104, FIG. 1), thereby eliminating the need for a client-server system. It should be noted that the home assistant system 300 is only one example of a home assistant system, and that the home assistant system 300 may have more or fewer components than shown, may combine two or more components, or may have a different configuration or arrangement of the components. The various components shown in FIG. 3A may be implemented in hardware, software, firmware, including one or more signal processing and/or application specific integrated circuits, or a combination of thereof.

The home assistant system 300 includes memory 302, one or more processors 304, an input/output (I/O) interface 306, and a network communications interface 308. These components communicate with one another over one or more communication buses or signal lines 310.

In some embodiments, memory 302 includes a non-transitory computer readable medium, such as high-speed random access memory and/or a non-volatile computer readable storage medium (e.g., one or more magnetic disk storage devices, one or more flash memory devices, one or more optical storage devices, and/or other non-volatile solid-state memory devices).

The I/O interface 306 couples input/output devices 316 of the home assistant system 300, such as displays, keyboards, touch screens, and microphones, to the user interface module 322. The I/O interface 306, in conjunction with the user interface module 322, receives user inputs (e.g., voice input, keyboard inputs, touch inputs, etc.) and process them accordingly. In some embodiments, when the home assistant is implemented on a standalone user device, the home assistant system 300 includes any of the components and I/O and communication interfaces described with respect to the user device 104 in FIG. 2 (e.g., one or more microphones 230). In some embodiments, the home assistant system 300 represents the server portion of a home assistant implementation, and interacts with the user through a client-side portion residing on a user device (e.g., the user device 104 shown in FIG. 2).

In some embodiments, the network communications interface 308 includes wired communication port(s) 312 and/or wireless transmission and reception circuitry 314. The wired communication port(s) receive and send communication signals via one or more wired interfaces, e.g., Ethernet, Universal Serial Bus (USB), FIREWIRE, etc. The wireless circuitry 314 typically receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The network communications interface 308 enables communication between the digital assistant system 300 with networks, such as the Internet, an intranet and/or a wireless network, such as a cellular telephone network, a wireless local area network (LAN) and/or a metropolitan area network (MAN), and other devices.

In some embodiments, the non-transitory computer readable storage medium of memory 302 stores programs, modules, instructions, and data structures including all or a subset of: an operating system 318, a communications module 320, a user interface module 322, one or more applications 324, and a digital assistant module 326. The one or more processors 304 execute these programs, modules, and instructions, and reads/writes from/to the data structures.

The operating system 318 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

The communications module 320 facilitates communications between the home assistant system 300 with other devices over the network communications interface 308. For example, the communication module 320 may communicate with the communications module 254 of the device 104 shown in FIG. 2. The communications module 320 also includes various software components for handling data received by the wireless circuitry 314 and/or wired communications port 312.

In some embodiments, the user interface module 322 receives commands and/or inputs from a user via the I/O interface 306 (e.g., from a keyboard, touch screen, and/or microphone), and provides user interface objects on a display.

The applications 324 include programs and/or modules that are configured to be executed by the one or more processors 304. For example, if the digital assistant system is implemented on a standalone user device, the applications 324 may include user applications, such as home control center, games, a calendar application, a navigation application, or an email application. If the home assistant system 300 is implemented on a server farm, the applications 324 may include resource management applications, diagnostic applications, or scheduling applications, for example.

Memory 302 also stores the home assistant module (or the server portion of a home assistant) 326. In some embodiments, the home assistant module 326 includes the following sub-modules, or a subset or superset thereof: an input/output processing module 328, a speech-to-text (STT) processing module 330, a natural language processing module 332, a dialogue flow processing module 334, a task flow processing module 336, a service processing module 338, and a speaker recognition module 340. Each of these processing modules has access to one or more of the following data and models of the home assistant 326, or a subset or superset thereof: ontology 360, vocabulary index 344, user data 348, task flow models 354, service models 356, speaker voice models 358.

In some embodiments, using the processing modules (e.g., the input/output processing module 328, the speaker recognition module 340, the STT processing module 330, the natural language processing module 332, the dialogue flow processing module 334, the task flow processing module 336, and/or the service processing module 338), data, and models implemented in the digital assistant module 326, the home assistant system 300 performs at least some of the following: identifying a user's intent expressed in a natural language input received from the user; actively eliciting and obtaining information needed to fully deduce the user's intent (e.g., by disambiguating words, names, intentions, etc.); determining the task flow for fulfilling the deduced intent; and executing the task flow to fulfill the deduced intent. In some embodiments, the home assistant also takes appropriate actions when a satisfactory response was not or could not be provided to the user for various reasons. In some embodiments, the memory includes a home control module 360 that utilizes the APIs of the home control services to control different home appliances that are registered with the digital assistant system in accordance with user commands and user intent that are deduced from the user's voice inputs.

Figure 3B:
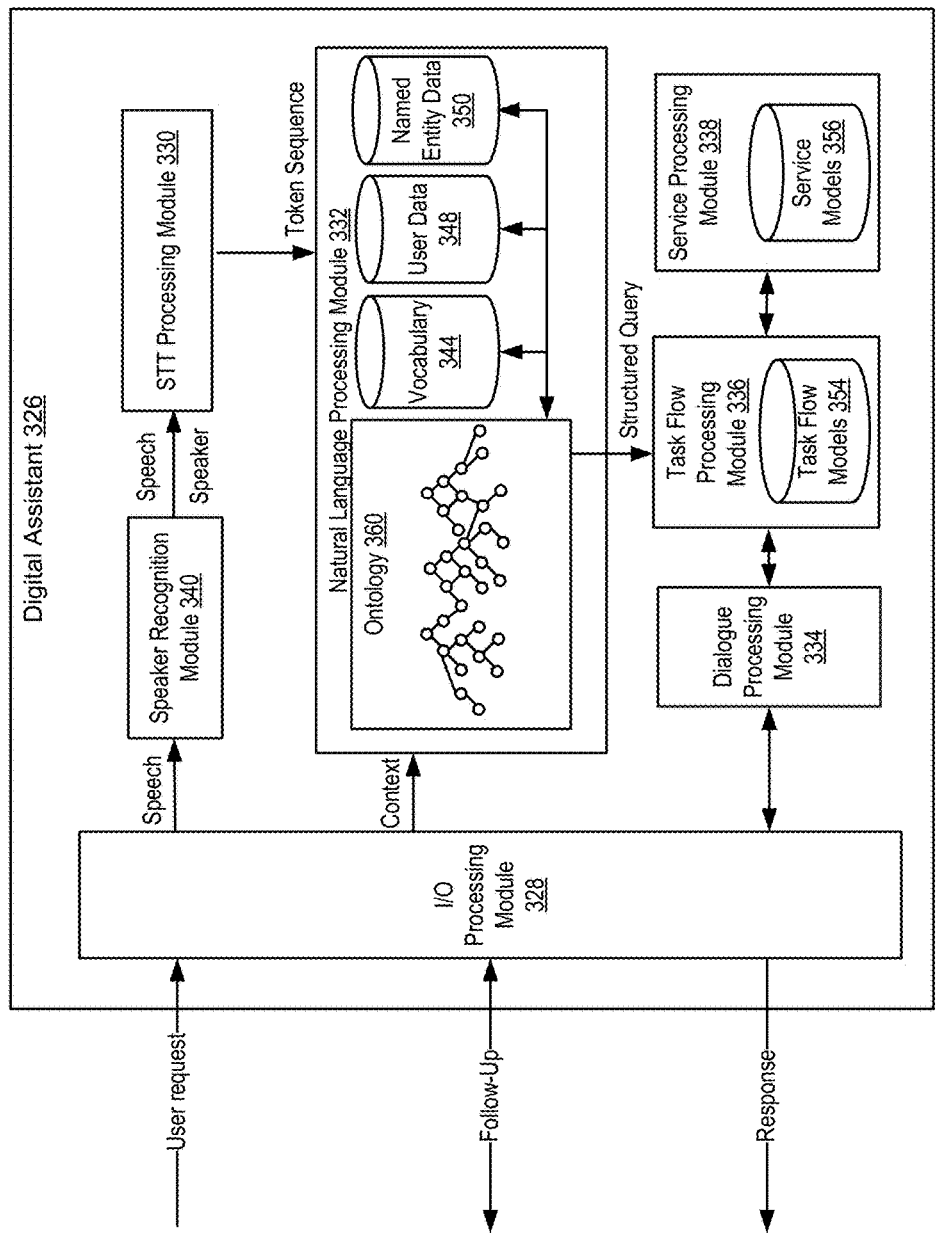
FIG. 3B is a block diagram illustrating functions of the digital assistant shown in FIG. 3A in accordance with some embodiments.

As shown in FIG. 3B, in some embodiments, the I/O processing module 328 interacts with the user through the I/O devices 316 in FIG. 3A or with a user device (e.g., a user device 104 in FIG. 1) through the network communications interface 308 in FIG. 3A to obtain user input (e.g., a speech input) and to provide responses to the user input. The I/O processing module 328 optionally obtains context information associated with the user input from the user device, along with or shortly after the receipt of the user input. The context information includes user-specific data, vocabulary, and/or preferences relevant to the user input. In some embodiments, the context information also includes software and hardware states of the device (e.g., the user device 104 in FIG. 1) at the time the user request is received, and/or information related to the surrounding environment of the user at the time that the user request was received. In some embodiments, the I/O processing module 328 also sends follow-up questions to, and receives answers from, the user regarding the user request. In some embodiments, when a user request is received by the I/O processing module 328 and the user request contains a speech input, the I/O processing module 328 forwards the speech input to speaker recognition module 340 for speaker recognition and subsequently to the speech-to-text (STT) processing module 330 for speech-to-text conversions. In some embodiments, person-specific speech-to-text models are selected to perform the speech-to-text conversion based on the speaker recognition result.

In some embodiments, the speech-to-text processing module 330 receives speech input (e.g., a user utterance captured in a voice recording) through the I/O processing module 328 or the speaker recognition module 340. In some embodiments, the speech-to-text processing module 330 uses various acoustic and language models to recognize the speech input as a sequence of phonemes, and ultimately, a sequence of words or tokens written in one or more languages. The speech-to-text processing module 330 is implemented using any suitable speech recognition techniques, acoustic models, and language models, such as Hidden Markov Models, Dynamic Time Warping (DTW)-based speech recognition, and other statistical and/or analytical techniques. In some embodiments, the speech-to-text processing can be performed at least partially by a third party service or on the user's device. Once the speech-to-text processing module 330 obtains the result of the speech-to-text processing (e.g., a sequence of words or tokens), it passes the result to the natural language processing module 332 for intent deduction. As disclosed herein, sample sentences generated by using the machine-generated context-free grammar can be used as the basis for training a speech-to-text processing module.

The natural language processing module 332 ("natural language processor") of the home assistant 326 takes the sequence of words or tokens ("token sequence") generated by the speech-to-text processing module 330, and attempts to associate the token sequence with one or more "actionable intents" recognized by the digital assistant. As used herein, an "actionable intent" represents a task that can be performed by the digital assistant 326 and/or the digital assistant system 300 (FIG. 3A), and has an associated task flow implemented in the task flow models 354. The associated task flow is a series of programmed actions and steps that the digital assistant system 300 takes in order to perform the task. The scope of a digital assistant system's capabilities is dependent on the number and variety of task flows that have been implemented and stored in the task flow models 354, or in other words, on the number and variety of "actionable intents" that the digital assistant system 300 recognizes. The effectiveness of the digital assistant system 300, however, is also dependent on the digital assistant system's ability to deduce the correct "actionable intent(s)" from the user request expressed in natural language. As disclosed herein, the machine-generated context-free grammar can be used to build the ontology and used by the natural language processing module of the digital assistant to process a natural language text string and deduce an intent that is represented in the ontology.

In some embodiments, in addition to the sequence of words or tokens obtained from the speech-to-text processing module 330, the natural language processor 332 also receives context information associated with the user request (e.g., from the I/O processing module 328). The natural language processor 332 optionally uses the context information to clarify, supplement, and/or further define the information contained in the token sequence received from the speech-to-text processing module 330. The context information includes, for example, user preferences, hardware and/or software states of the user device, sensor information collected before, during, or shortly after the user request, prior interactions (e.g., dialogue) between the digital assistant and the user, and the like.

In some embodiments, the natural language processing is based on an ontology 360. The ontology 360 is a hierarchical structure containing a plurality of nodes, each node representing either an "actionable intent" or a "property" relevant to one or more of the "actionable intents" or other "properties." As noted above, an "actionable intent" represents a task that the digital assistant system 300 is capable of performing (e.g., a task that is "actionable" or can be acted on). A "property" represents a parameter associated with an actionable intent or a sub-aspect of another property. A linkage between an actionable intent node and a property node in the ontology 360 defines how a parameter represented by the property node pertains to the task represented by the actionable intent node.

In some embodiments, the ontology 360 is made up of actionable intent nodes and property nodes. Within the ontology 360, each actionable intent node is linked to one or more property nodes either directly or through one or more intermediate property nodes. Similarly, each property node is linked to one or more actionable intent nodes either directly or through one or more intermediate property nodes.

An actionable intent node, along with its linked concept nodes, may be described as a "domain." In the present discussion, each domain is associated with a respective actionable intent, and refers to the group of nodes (and the relationships therebetween) associated with the particular actionable intent.

In some embodiments, the ontology 360 includes all the domains (and hence actionable intents) that the digital assistant is capable of understanding and acting upon. In some embodiments, the ontology 360 may be modified, such as by adding or removing domains or nodes, or by modifying relationships between the nodes within the ontology 360.

In some embodiments, nodes associated with multiple related actionable intents may be clustered under a "super domain" in the ontology 360. For example, a "home control" super-domain may include a cluster of property nodes and actionable intent nodes related to home appliance control. The actionable intent nodes related to home appliance control may include "air conditioning" "kitchen appliance control" "lighting control" "energy saving control" "media center control" and so on. The actionable intent nodes under the same super domain (e.g., the "home control" super domain) may have many property nodes in common. For example, the actionable intent nodes for "adjust room temperature" "energy saving control" "stovetop control" "laundry machine control" may share one or more of the property nodes "start time," "end time," "energy-saving mode," etc.

In some embodiments, each node in the ontology 360 is associated with a set of words and/or phrases that are relevant to the property or actionable intent represented by the node. The respective set of words and/or phrases associated with each node is the so-called "vocabulary" associated with the node. The respective set of words and/or phrases associated with each node can be stored in the vocabulary index 344 (FIG. 3B) in association with the property or actionable intent represented by the node. For example, returning to FIG. 3B, the vocabulary associated with the node for the property of "restaurant" may include words such as "food," "drinks," "cuisine," "hungry," "eat," "pizza," "fast food," "meal," and so on. For another example, the vocabulary associated with the node for the actionable intent of "initiate a phone call" may include words and phrases such as "call," "phone," "dial," "ring," "call this number," "make a call to," and so on. The vocabulary index 344 optionally includes words and phrases in different languages.

In some embodiments, the natural language processor 332 shown in FIG. 3B receives the token sequence (e.g., a text string) from the speech-to-text processing module 330, and determines what nodes are implicated by the words in the token sequence. In some embodiments, if a word or phrase in the token sequence is found to be associated with one or more nodes in the ontology 360 (via the vocabulary index 344), the word or phrase will "trigger" or "activate" those nodes. When multiple nodes are "triggered," based on the quantity and/or relative importance of the activated nodes, the natural language processor 332 will select one of the actionable intents as the task (or task type) that the user intended the digital assistant to perform. In some embodiments, the domain that has the most "triggered" nodes is selected. In some embodiments, the domain having the highest confidence value (e.g., based on the relative importance of its various triggered nodes) is selected. In some embodiments, the domain is selected based on a combination of the number and the importance of the triggered nodes. In some embodiments, additional factors are considered in selecting the node as well, such as whether the home assistant system 300 has previously correctly interpreted a similar request from a user.

In some embodiments, the digital assistant system 300 also stores names of specific entities in the named entity database 350, so that when one of these names is detected in the user request, the natural language processor 332 will be able to recognize that the name refers to a specific instance of a property or sub-property in the ontology. In some embodiments, the names of specific entities are names of businesses, restaurants, people, movies, and the like. In some embodiments, the named entity database 305 also includes the aliases of the home devices that are provided by individual users during the device registration stage for the different home devices. In some embodiments, the digital assistant system 300 can search and identify specific entity names from other data sources, such as the user's address book or contact list, a movies database, a musicians database, and/or a restaurant database. In some embodiments, when the natural language processor 332 identifies that a word in the token sequence is a name of a specific entity (such as a name in the user's address book or contact list, or in the name list of the home devices), that word is given additional significance in selecting the actionable intent within the ontology for the user request. In some embodiments, the trigger phrase for the digital assistant is stored as a named entity, so that it can be identified and given special significance when it exists in the speech input of the user.

In some embodiments, the machine-generated context-free grammar is used to implement the ontology and named-entity database used to process the user's command, and deduce the user's intent.

User data 348 includes user-specific information, such as user-specific vocabulary, user preferences, user address, user's default and secondary languages, user's contact list, and other short-term or long-term information for each user. The natural language processor 332 can use the user-specific information to supplement the information contained in the user input to further define the user intent. In some embodiments, the machine-generated context-free grammar is used to implement the user-specific vocabulary and preferences when processing the user's command, and deduce the user's intent.

Once the natural language processor 332 identifies an actionable intent (or domain) based on the user request, the natural language processor 332 generates a structured query to represent the identified actionable intent. In some embodiments, the structured query includes parameters for one or more nodes within the domain for the actionable intent, and at least some of the parameters are populated with the specific information and requirements specified in the user request. For example, the user may say, "Let Slinky work." In this case, the natural language processor 332 may be able to correctly identify the actionable intent to be "turn on the air conditioner" based on the user input. According to the ontology, a structured query for a "turn-on-air-conditioner" domain may include parameters such as {Air Conditioner ID}, {Time}, {Temperature}, {Energy Mode}, and the like. Based on the information contained in the user's utterance, the natural language processor 332 may generate a partial structured query for the restaurant reservation domain, where the partial structured query includes the parameters {Air Conditioner ID="Slinky"=air conditioner in baby's room="device address xxxx"} {Time="now"}, {Temperature=default=74 degrees}. In this example, the user's utterance contains insufficient information to complete the structured query associated with the domain, and some of the information is automatically filled based on user's past preference and stored user's specific vocabulary.

In some embodiments, the natural language processor 332 passes the structured query (including any completed parameters) to the task flow processing module 336 ("task flow processor"). The task flow processor 336 is configured to perform one or more of: receiving the structured query from the natural language processor 332, completing the structured query, and performing the actions required to "complete" the user's ultimate request. In some embodiments, the various procedures necessary to complete these tasks are provided in task flow models 354. In some embodiments, the task flow models 354 include procedures for obtaining additional information from the user, and task flows for performing actions associated with the actionable intent. In some embodiments, the task flows in the task flow models 354 describe the steps for controlling each home device that is registered with the home assistant, and based on the device name list the digital assistant operates to execute the steps in a suitable task flow with respect to the home device that is specified by the alias of the home device in the user's speech input.

As described above, in order to complete a structured query, the task flow processor 336 may need to initiate additional dialogue with the user in order to obtain additional information, and/or disambiguate potentially ambiguous utterances. When such interactions are necessary, the task flow processor 336 invokes the dialogue processing module 334 ("dialogue processor") to engage in a dialogue with the user. In some embodiments, the dialogue processing module 334 determines how (and/or when) to ask the user for the additional information, and receives and processes the user responses. In some embodiments, the questions are provided to and answers are received from the users through the I/O processing module 328. For example, the dialogue processing module 334 presents dialogue output to the user via audio and/or visual output, and receives input from the user via spoken or physical (e.g., touch gesture) responses. Once answers are received from the user, the dialogue processing module 334 populates the structured query with the missing information, or passes the information to the task flow processor 336 to complete the missing information from the structured query.

Once the task flow processor 336 has completed the structured query for an actionable intent, the task flow processor 336 proceeds to perform the ultimate task associated with the actionable intent. Accordingly, the task flow processor 336 executes the steps and instructions in the task flow model according to the specific parameters contained in the structured query. For example, the task flow model for the actionable intent of "turn-on-air-conditioner" may include steps and instructions for identifying the encoded instruction for turning on the air conditioner, sending the encoded instruction to the air conditioner over a home network, selecting a temperature and an energy saving mode after the air conditioner is turned on, and sending the command for the temperature and energy saving mode to the air conditioner over the home network.

In some embodiments, the task flow processor 336 employs the assistance of a service processing module 338 ("service processor") to complete a task requested in the user input or to provide an informational answer requested in the user input. For example, the service processor 338 can act on behalf of the task flow processor 336 to send a command to a home appliance, make a phone call, set a calendar entry, invoke a map search, invoke or interact with other user applications installed on the user device, and invoke or interact with third party services (e.g. a restaurant reservation portal, a social networking website or service, a banking portal, etc.). In some embodiments, the protocols and application programming interfaces (API) required by each service can be specified by a respective service model among the service models 356. The service processor 338 accesses the appropriate service model for a service and generates requests for the service in accordance with the protocols and APIs required by the service according to the service model.

In some embodiments, the natural language processor 332, dialogue processor 334, and task flow processor 336 are used collectively and iteratively to deduce and define the user's intent, obtain information to further clarify and refine the user intent, and finally generate a response (e.g., provide an output to the user, or complete a task) to fulfill the user's intent.

Figure 4:
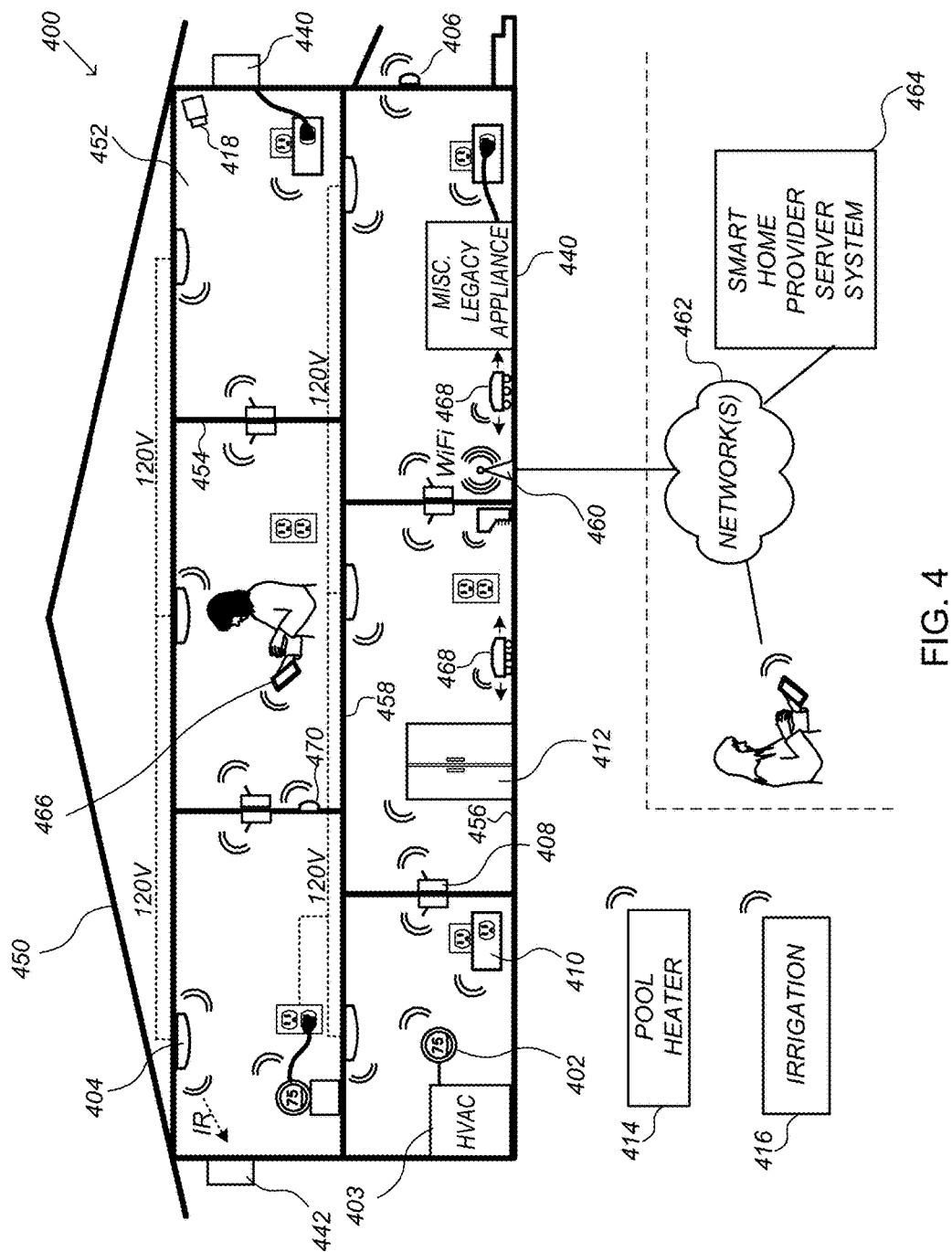
FIG. 4 is a smart home environment including multiple home devices that are controllable by a digital home assistant in accordance with some embodiments.

FIG. 4 is an exemplary smart home environment in accordance with some implementations. Smart home environment 400 includes a structure 450, which is optionally a house, office building, garage, or mobile home. It will be appreciated that devices may also be integrated into a smart home environment 400 that does not include an entire structure 450, such as an apartment, condominium, or office space. Further, the smart home environment may control and/or be coupled to devices outside of the actual structure 450. Indeed, several devices in the smart home environment need not be physically within the structure 450. For example, a device controlling a pool heater 414 or irrigation system 416 may be located outside of structure 450.

The depicted structure 450 includes a plurality of rooms 452, separated at least partly from each other via walls 454. The walls 454 may include interior walls or exterior walls. Each room may further include a floor 456 and a ceiling 458. Devices may be mounted on, integrated with and/or supported by a wall 454, floor 456 or ceiling 458.

In some implementations, the smart home environment 400 includes a plurality of devices, including intelligent, multi-sensing, network-connected devices, that integrate seamlessly with each other in a smart home network (e.g., 202 FIG. 2) and/or with a central server or a cloud-computing system to provide a variety of useful smart home functions. The smart home environment 400 may include one or more intelligent, multi-sensing, network-connected thermostats 402 (hereinafter referred to as "smart thermostats 402"), one or more intelligent, network-connected, multi-sensing hazard detection units 404 (hereinafter referred to as "smart hazard detectors 404"), and one or more intelligent, multi-sensing, network-connected entryway interface devices 406 (hereinafter referred to as "smart doorbells 406"). In some implementations, the smart thermostat 402 detects ambient climate characteristics (e.g., temperature and/or humidity) and controls a HVAC system 403 accordingly. The smart hazard detector 404 may detect the presence of a hazardous substance or a substance indicative of a hazardous substance (e.g., smoke, fire, and/or carbon monoxide). The smart doorbell 406 may detect a person's approach to or departure from a location (e.g., an outer door), control doorbell functionality, announce a person's approach or departure via audio or visual means, and/or control settings on a security system (e.g., to activate or deactivate the security system when occupants go and come).

In some implementations, the smart home environment 400 includes one or more intelligent, multi-sensing, network-connected wall switches 408 (hereinafter referred to as "smart wall switches 408"), along with one or more intelligent, multi-sensing, network-connected wall plug interfaces 410 (hereinafter referred to as "smart wall plugs 410"). The smart wall switches 408 may detect ambient lighting conditions, detect room-occupancy states, and control a power and/or dim state of one or more lights. In some instances, smart wall switches 408 may also control a power state or speed of a fan, such as a ceiling fan. The smart wall plugs 410 may detect occupancy of a room or enclosure and control supply of power to one or more wall plugs (e.g., such that power is not supplied to the plug if nobody is at home).

In some implementations, the smart home environment 400 of FIG. 4 includes a plurality of intelligent, multi-sensing, network-connected appliances 412 (hereinafter referred to as "smart appliances 412"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 440, such as old conventional washer/dryers, refrigerators, and the like, which may be controlled by smart wall plugs 410. The smart home environment 400 may further include a variety of partially communicating legacy appliances 442, such as infrared ("IR") controlled wall air conditioners or other IR-controlled devices, which may be controlled by IR signals provided by the smart hazard detectors 404 or the smart wall switches 408.

In some implementations, the smart home environment 400 includes one or more network-connected cameras 418 that are configured to provide video monitoring and security in the smart home environment 400.

The smart home environment 400 may also include communication with devices outside of the physical home but within a proximate geographical range of the home. For example, the smart home environment 400 may include a pool heater monitor 414 that communicates a current pool temperature to other devices within the smart home environment 400 and/or receives commands for controlling the pool temperature. Similarly, the smart home environment 400 may include an irrigation monitor 416 that communicates information regarding irrigation systems within the smart home environment 400 and/or receives control information for controlling such irrigation systems.

By virtue of network connectivity, one or more of the smart home devices of FIG. 4 may further allow a user to interact with the device even if the user is not proximate to the device. For example, a user may communicate with a device using a computer (e.g., a desktop computer, laptop computer, or tablet) or other portable electronic device (e.g., a smartphone) 466. A webpage or application may be configured to receive communications from the user and control the device based on the communications and/or to present information about the device's operation to the user. For example, the user may view a current set point temperature for a device and adjust it using a computer. The user may be in the structure during this remote communication or outside the structure.

As discussed above, users may control the smart thermostat and other smart devices in the smart home environment 400 using a network-connected computer or portable electronic device 466. In some examples, some or all of the occupants (e.g., individuals who live in the home) may register their device 466 with the smart home environment 400. Such registration may be made at a central server to authenticate the occupant and/or the device as being associated with the home and to give permission to the occupant to use the device to control the smart devices in the home. An occupant may use their registered device 466 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 466, the smart home environment 400 may make inferences about which individuals live in the home and are therefore occupants and which devices 466 are associated with those individuals. As such, the smart home environment may "learn" who is an occupant and permit the devices 466 associated with those individuals to control the smart devices of the home.

In some implementations, in addition to containing processing and sensing capabilities, devices 402, 404, 406, 408, 410, 412, 414, 416 and/or 418 (collectively referred to as "the smart devices") are capable of data communications and information sharing with other smart devices, a central server or cloud-computing system, and/or other devices that are network-connected. The required data communications may be carried out using any of a variety of custom or standard wireless protocols (IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (CAT6 Ethernet, HomePlug, etc.), or any other suitable communication protocol, including communication protocols not yet developed as of the filing date of this document.

In some implementations, the smart devices serve as wireless or wired repeaters. For example, a first one of the smart devices communicates with a second one of the smart devices via a wireless router. The smart devices may further communicate with each other via a connection to one or more networks 462, such as the Internet. Through the one or more networks 462, the smart devices may communicate with a smart home provider server system 464 (also called a central server system and/or a cloud-computing system herein). In some implementations, the smart home provider server system 464 may include multiple server systems each dedicated to data processing associated with a respective subset of the smart devices (e.g., a video server system may be dedicated to data processing associated with camera(s) 418). The smart home provider server system 464 may be associated with a manufacturer, support entity, or service provider associated with the smart device. In some implementations, a user is able to contact customer support using a smart device itself rather than needing to use other communication means, such as a telephone or Internet-connected computer. In some implementations, software updates are automatically sent from the smart home provider server system 464 to smart devices (e.g., when available, when purchased, or at routine intervals).

In some embodiments, one or more of the smart devices in the home include open audio input channels that can capture audio input in their vicinity and serve as the audio input device for a home assistant (e.g., home assistant 106, 104, 300, and/or 326) that controls all the smart devices installed in the home. In some embodiments, one of the smart devices also include the digital assistant module and serves as the home assistant that manages all the smart devices installed in the home. In some embodiments, a standalone home assistant device exists independent of the portable devices 466 and the smart home devices installed in the home, and the standalone home assistance device receives and respond to voice inputs from multiple members of the household living in the home. In some embodiments, there may be multiple home assistant devices distributed throughout the house that operate independently or in cooperation with one another when controlling the smart devices installed in the home.

Figure 5A:
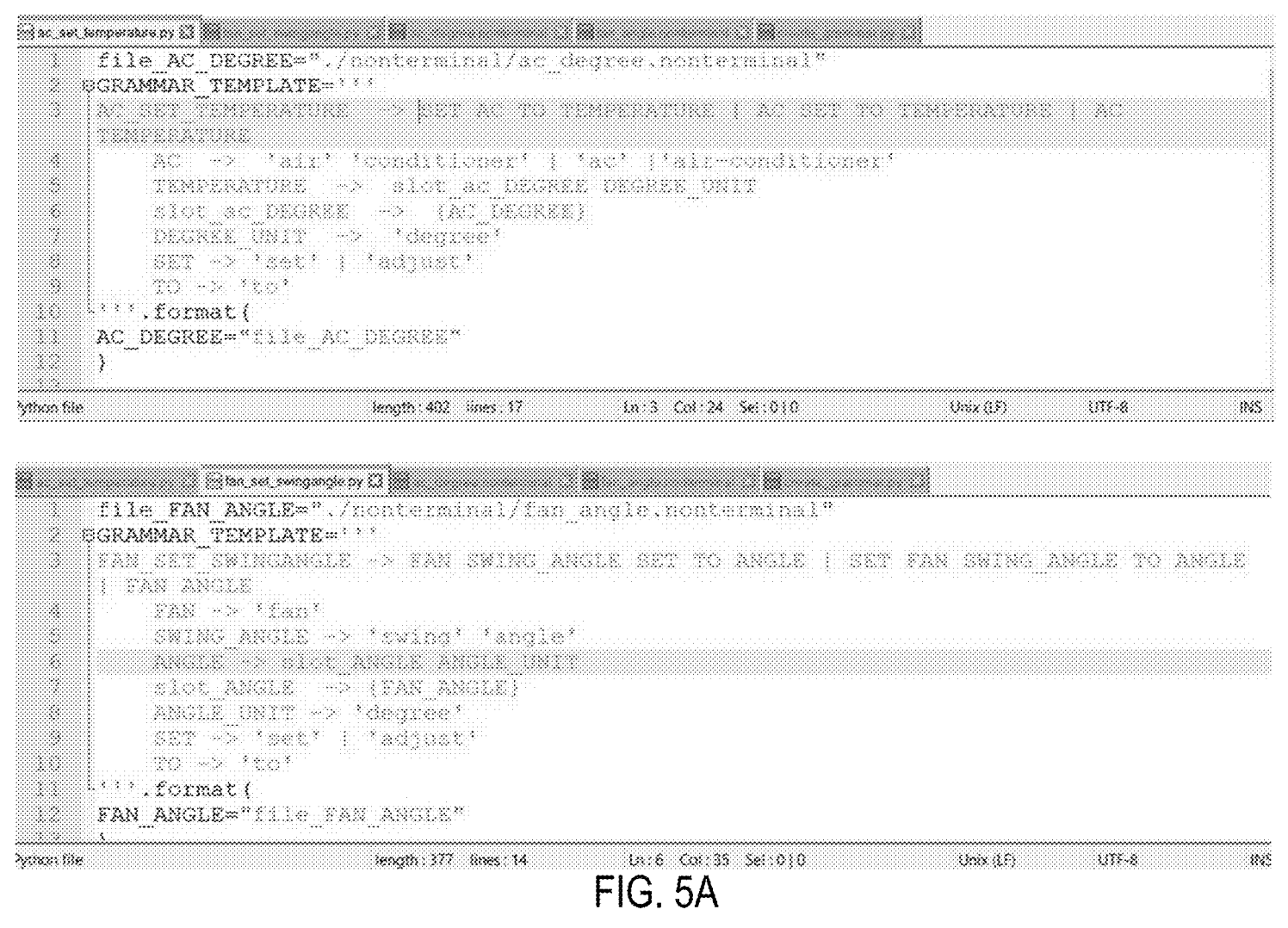
Figure 5B:
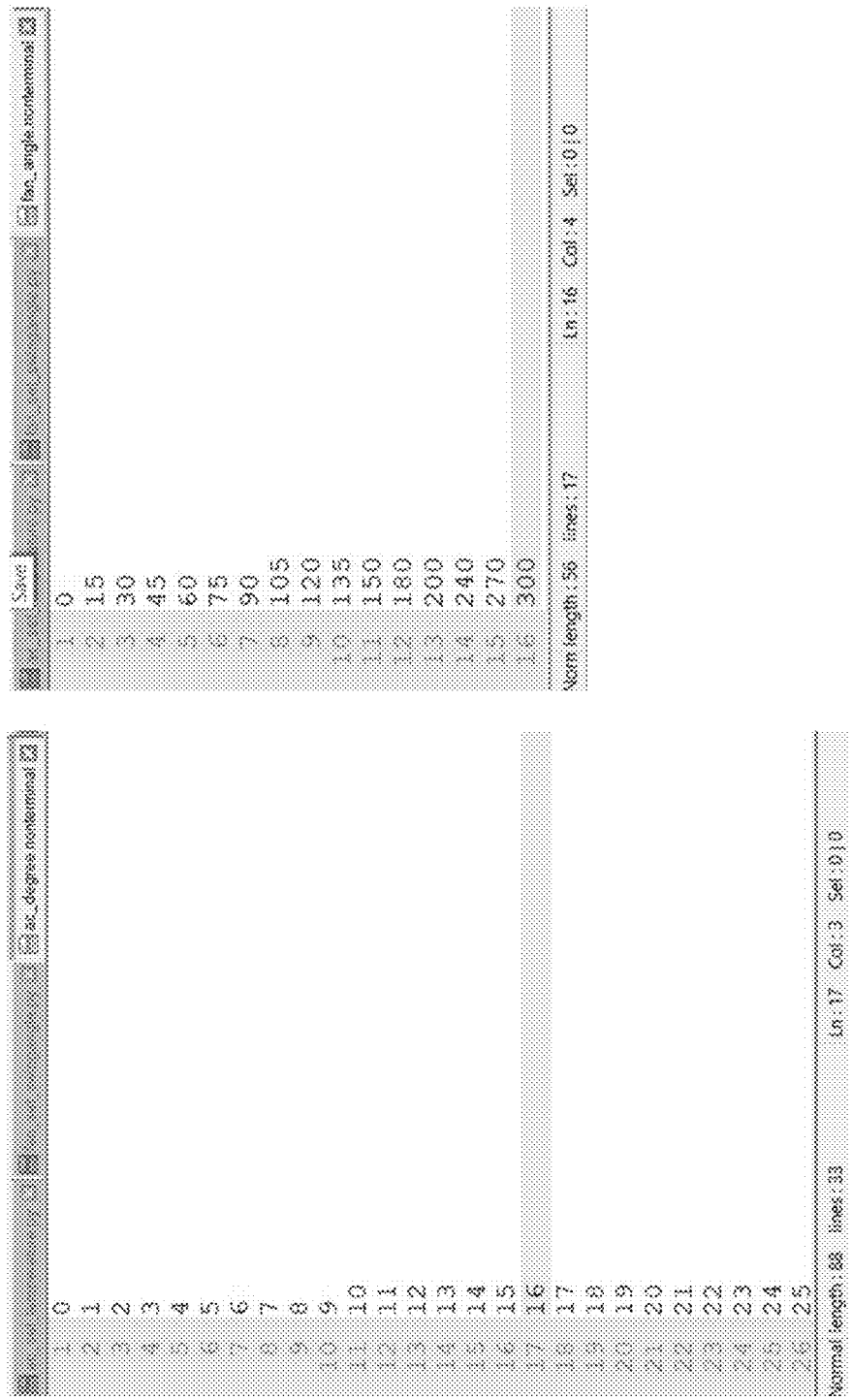
Figure 5C:
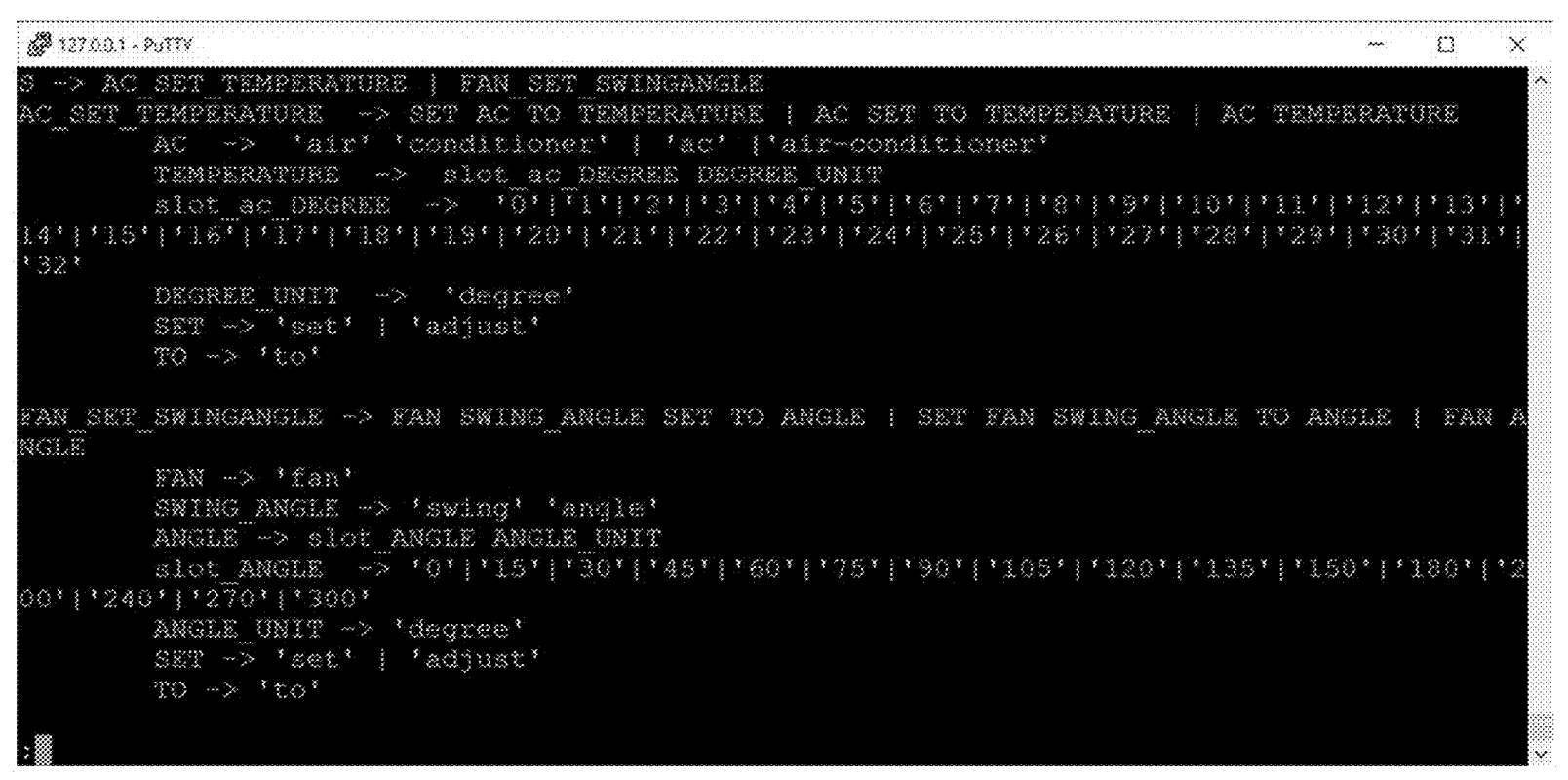

FIGS. 5A-5C are block diagrams illustrating an example process for generating context-free grammar for actionable intents for two example tasks that can be performed by a machine, in accordance with some embodiments. For illustrative purposes, the method is described in the context of home control functions (e.g., setting an air conditioner temperature, and setting a fan swing angle). However, other applications of the method are possible. For example, other applications that involve many settings and functions of devices and multiple users sharing the same devices, multiple devices of the same type being used in the same environment, etc., can all benefit from the automatic machine generation of context-free grammar for deducting user intent, as described herein.

In some embodiments, as shown in FIG. 5A, two template files are created by a programmer, including a first template file (e.g., ac_set_temperature.py) corresponding to the actionable intent for setting the air conditioner temperature, and a second template file (e.g., fan_set_swingangle.py) corresponding to the actionable intent for setting the fan swing angle. The template files are optionally written in accordance with the syntax of a respective programming language (e.g., python, perl, C++, etc.). The programming language provides the syntax for establishing a correspondence between an actionable intent (e.g., "AC_SET_TEMPERATURE" or "FAN_SET_SWINGANGLE") and one or more production rules that describe the strings of symbols that correspond to the actionable intent. In some embodiments, a respective production rule optionally includes one or more nonterminal variables that can be replaced by more than one terminal values (also referred to as named entity values).

In the example shown in FIG. 5A (upper portion), for a first actionable intent of "setting the air conditioner temperature", the production rule "AC_SET_TEMPERATURE→|SET AC TO TEMPERATURE | AC SET TO TEMPERATURE | AC TEMPERATURE" specifies string patterns corresponding to the actionable intent of "setting the air conditioner temperature" that are expressed in concatenation of multiple nonterminal variables (e.g., "SET", "AC", "TO", and "TEMPERATURE"). The terminal values of some of these nonterminal variables are enumerated in corresponding production rules in the template file. For example, the variable "SET" corresponds to terminal values "set" and "adjust"; the variable "AC" corresponds to terminal values "air" "conditioner", "ac", and "air-conditioner"; the variable "DEGREE_UNIT" corresponds to a terminal value of "degree"; and the variable "TO" corresponds to a terminal value of "to". The production rule for the variable "TEMPERATURE" includes a string expressed in two nonterminal variables "slot_ac_DEGREE" followed by "DEGREE_UNIT." The production rule including the variable "slot_ac_DEGREE" refers to a variable "AC_DEGREE" which further refers to a nonterminal file "file_DEGREE" with a filepath"./nonterminal/digits.nonterminal". Based on the production rule "slot_ac_DEGREE→{DEGREE}" which refers to the nonterminal file "file_DEGREE" (e.g., with a filepath of "./nonterminal/digits.nonterminal"), the complier compiling the template file retrieves the nonterminal file "digits.nonterminal" and generates the context-free grammar for the actionable intent corresponding to the task of setting the air conditioner temperature by replacing the nonterminal variable "DEGREE" with the degree values listed in the nonterminal file "digits.nonterminal". The content of the nonterminal file "digits.nonterminal" is shown in FIG. 5B (left). FIG. 5C (top portion) shows the compiler-generated context-free grammar for the actionable intent corresponding to the task of setting the air conditioner temperature. The compiler-generated context-free grammar replaces the variable "AC_DEGREE" in the production rule "slot_ac_DEGREE→{AC_DEGREE} with a listing of alternative strings "0"|"1"|"2"| . . . |"32".

In some embodiments, when a new function is developed for a device (e.g., new function for an existing appliance, or a new function for a new model of the appliance, a new function for a new appliance, etc.), the context-free grammar of at least one new actionable intent for the new function needs to be generated and merged into the existing context-free grammar used by the digital assistant. In this example, suppose that the new function that is added to the repertoire of the digital assistant is the actionable intent of "setting the fan swing angle." In order to generate the context-free grammar for the actionable intent of "set fan swing angle," a programmer writes the production rules in the second template file "fan_set_swingangle.gy."

As shown in FIG. 5A (lower portion), the production rule "FAN_SET_SWINGANGLE→FAN SWING_ANGLE SET TO ANGLE | SET FAN SWING_ANGLE TO ANGLE | FAN ANGLE" specifies string patterns corresponding to the actionable intent of "setting the fan swing angle" that are expressed in concatenation of multiple nonterminal variables (e.g., "FAN", "SWING_ANGLE", "ANGLE", "SET", and "TO"). The terminal values of some of these nonterminal variables are enumerated in corresponding production rules in the second template file. For example, the variable "SET" corresponds to terminal values "set" and "adjust"; the variable "FAN" corresponds to terminal values "fan"; the variable "TO" corresponds to a terminal value of "to"; and the variable "SWING_ANGLE" corresponds to a string of "swing" followed by "angle". The production rule for the variable "ANGLE" includes a string expressed in two nonterminal variables "slot_ANGLE" followed by "ANGLE_UNIT." The production rule including the variable "slot_ANGLE" refers to a variable "FAN_ANGLE" which further refers to a nonterminal file "file_FAN_ANGLE" with a filepath"./nonterminal/fan_angle.nonterminal". Based on the production rule "slot_ANGLE→{FAN_ANGLE}" which refers to the nonterminal file "file_FAN_ANGLE" (e.g., with a filepath of "./nonterminal/fan_angle.nonterminal"), the complier compiling the second template file retrieves the nonterminal file "fan_angle.nonterminal" and generates the context-free grammar for the actionable intent corresponding to the task of setting the fan swing angle by replacing the nonterminal variable "FAN_ANGLE" with the degree values listed in the nonterminal file "fan_angle.nonterminal". The content of the nonterminal file "fan_angle.nonterminal" is shown in FIG. 5B (right). FIG. 5C (bottom portion) shows the compiler-generated context-free grammar for the actionable intent corresponding to the task of setting the fan swing angle. The compiler-generated context-free grammar replaces the variable "FAN_ANGLE" in the production rule "slot_ANGLE"→{FAN_ANGLE} with a listing of alternative strings "0"|"15"|"30"| . . . |"300".

In some embodiments, after a newly generated context-free grammar for the new function of setting the fan swing angle become available, the newly generated context-free grammar can be merged with other existing and/or new context-free grammar for other tasks. As shown in FIG. 5C, the context-free grammar for setting the air conditioner temperature and the context-free grammar for setting the fan swing angle are combined by the production rule "S→AC_SET_TEMPERATURE | FAN_SET_SWINGANGLE". In some embodiments, the newly generated context-free grammar are merged into the existing combined context-free grammar at the appropriate locations, e.g., based on the relatedness of the functions, such as based on the domains, types of devices, and/or types of functions.

As illustrated above, the generation of context-free grammar is modular and easily extensible. The programmer only needs to create a simple program that describes the basic examples of the command structures for a task, and the compiler does the job of writing out the context-free grammar for actual named entity values for one or more variables. This is particularly helpful when there are a large number of functions and parameters, which makes the combined context-free grammar of a particular domain very large, and making manual insertion of new functions difficult and error-prone. Now individual context-free grammar for each respective function can be individually created and debugged before they are merged into the combined context-free grammar for entire domains or all domains handled by the digital assistant, making the addition of new functions and domains easier and requiring less institutionally knowledge on the part of the programmers and reducing chances of conflicts and errors in the combined context-free grammar.

The examples in FIGS. 5A-5C are very simple to illustrate the basic concepts. In actual implementations in real-life working examples, there may be hundreds or even thousands of functions and parameters represented in the combined context-free grammar. Thus, to update the context-free grammar of an existing function or adding or removing certain parameter values can be difficult to perform manually. For example, using conventional methods, the programmer may have to manually scan through thousands of pages of tedious production rules to identify the correction function and lines to correct and make change to. The manual error, once committed, affects the functions of the entire combined context-grammar, and making it unfeasible and prohibitive to increase the functions covered by the combined context-free grammar. Using the modular, extensible, and machine-generation of context-free grammar disclosed herein helps to avoid the drawbacks of the conventional manual generation methods.

Further based on the examples shown in FIGS. 5A-5C, it can be seen that, if the template file is updated, e.g., to increase one or more production rules, or revise one or more existing production rules by adding in one or more alternative substitution terms or strings, etc. For example, the production rule "DEGREE_UNIT→'degree'" may be revised to become "DEGREE_UNIT→'degree'|'Celsius'". In accordance with a determination that the template file for the task of setting air conditioner temperature has been modified or updated, the device optionally regenerates the context-free grammar for the task, by recompiling the template file. Any errors discovered in the recompilation of the first template file can be fixed by the programmer without impacting the existing combined context-free grammar or the function of the digital assistant. Once the updated context-free grammar has been generated, it can replace the existing context-free grammar for the same task in the combined context-free grammar.

In some embodiments, the update of the context-free grammar can also be accomplished by updating the values in the nonterminal files. For example, if the fan swing angle can now be adjusted by 5-degree increment as opposed to the 15-degree increment implemented in the past. The nonterminal file "fan_angle.terminal" is updated to include additional values, such as 5, 10, 20, 25, etc. In some embodiments, in accordance with a determination that the nonterminal file referenced by a production rule in a template file has been updated, the template file is recompiled and the context-free grammar is generated by replacing the relevant variable in the production rule with the named entity values set forth in the updated nonterminal file.

As discussed above, it is very easy to update the template file and/or the nonterminal file that are associated with a respective task, and before the context-free grammar is checked by the compiler for errors and integrated into the combined context-free grammar, the update to the nonterminal file makes no impact on the combined context-free grammar. This makes adding new functions and new parameters to the combined context-free grammar a less complicated and more manageable process, as compared to the convention methods.

As discussed earlier, it is difficult to obtain training samples for speech-to-text conversion models. In some embodiments, the machine-generated context-free grammar as disclosed herein can be used to output strings that include all possible string patterns that can be generated from the production rules in the machine-generated context-free gramma for a respective task. Using these string patterns, a speech-to-text conversion model can be trained to recognize all possible commands that are used to trigger the performance of the respective task. Therefore, there is no need to gather the string patterns from real speech samples uttered by real users, making the expansion of the capabilities of the speech-to-text conversion models faster and less costly.

In some embodiments, when a home has multiple devices of the same type, such as multiple air conditioners, different names (e.g., "cool cat", "breeze one", etc.) may be given to different ones of the air conditioners. In some embodiments, updated context-free grammar that recognizes the names of the air conditioners is generated by updating the template files related to air conditioner functions to include an additional nonterminal variable for the names of the air conditioner. The nonterminal variable for the names of the air conditioners is optionally added as a modifier of the strings for "AC" in the production rule "AC→'air' 'conditioner' | 'ac' | 'air-conditioner', or simply is added as an alternative to 'air' 'conditioner' | 'ac' | 'air-conditioner' in the production rule. In some embodiments, if the nonterminal variable for the names of the air conditioners (e.g., AC_NAME) is added as a modifier of the strings for "AC" in the production rule, the names of the air conditioners registered by the users are included in the nonterminal file corresponding to the variable AC_NAME. In some embodiments, the names of the air conditioners can be easily changed or added by updating the nonterminal file corresponding to the variable AC_NAME. It can be seen that in the above example, that the machine-generation of context-free grammar is easily adaptable to methods where multiple devices of the same type can be controlled via a voice-based digital assistant.

In some embodiments, in a context where multiple users are allowed to control the same device, the multiple users can choose to give the device different names. For example, in a registration process, each user can give a different alias to the same device. All the different aliases are associated with the same device serial number. Based on the device type, the machine-generated context-free grammar can be programmed to use a different set of names for devices when analyzing the utterances of different users. For example, the production rules for a command received from different users are different in that, the name variable for a given device calls for a different nonterminal file depending on the user's identity. The nonterminal file for each user includes the alias that the user has given that device. When a user decides to change the alias given to the device, the system updates the nonterminal file based on user input, and updates the context-free grammar automatically by recompiling the template files that reference the name variable for device. As such, users can frequently update the device aliases based on personal preferences, without accidentally causing negative impact on the context-free grammar for tasks related to the device.

Figure 6:
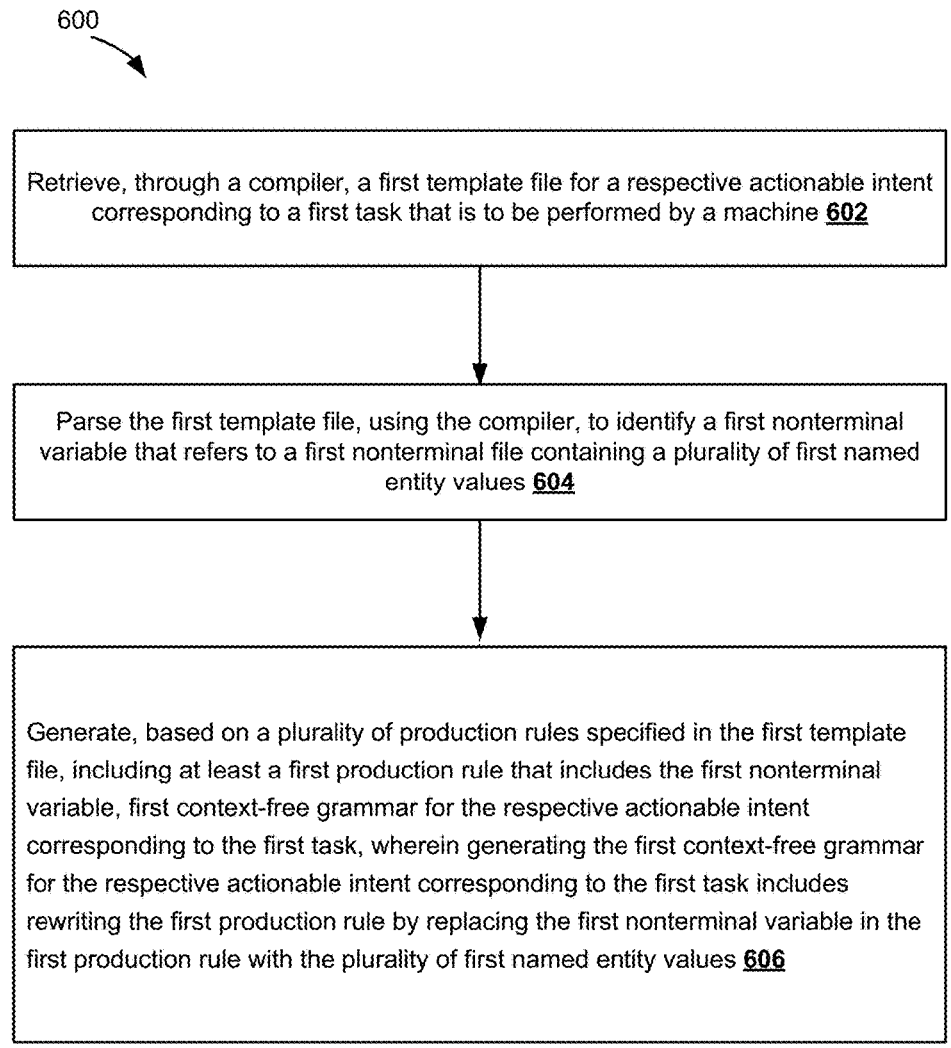
FIG. 6 is a flowchart illustrating methods for machine generation of context-free grammar for intent deduction, in accordance with some embodiments.

FIG. 6 is a flow diagram representing methods for machine-generation of context-free grammar for intent deduction in accordance with some embodiments. The methods are, optionally, governed by instructions that are stored in a computer memory or non-transitory computer readable storage medium (e.g., memory 250 of client device 104, memory 302 associated with the digital assistant system 300) and that are executed by one or more processors of one or more computer systems of a digital assistant system, including, but not limited to, the server system 108, and/or the user device 104-*a*. In some embodiments, the computer-readable storage medium and computer system referred to in this specification are a separate system from the digital assistant system, and provides the context-free grammar to the digital assistant system after the context-free grammar has been generated. The computer readable storage medium may include a magnetic or optical disk storage device, solid-state storage devices such as Flash memory, or other non-volatile memory device or devices. The computer readable instructions stored on the computer readable storage medium may include one or more of: source code, assembly language code, object code, or other instruction format that is interpreted by one or more processors. In various embodiments, some operations in each method may be combined and/or the order of some operations may be changed from the order shown in the figures. Also, in some embodiments, operations shown in separate figures and/or discussed in association with separate methods may be combined to form other methods, and operations shown in the same figure and/or discussed in association with the same method may be separated into different methods. In some embodiments, the computer system includes a compiler program that compiles computer code in accordance with predefined syntax of a respective program language, and carries out the substitution of named entity values from a nonterminal file for a nonterminal variable in the template file in accordance with predefined substitution format (e.g., as illustrated in FIGS. 5A-5C). In some embodiments, the computer system includes instructions for executing the calling up the compiler to compile one or more template files, and generating and merging the context-free grammars represented in the template files. In some embodiments, the computer system further stores the nonterminal files in designated directory paths, and retrieves the nonterminal files, parse them for the purpose of generating the context-free grammar in accordance with the method described herein.

FIG. 6 illustrates a method 600 of machine-generation of context-free grammar for intent deduction. The method is performed at a computing system having one or more processors and memory. The method includes: retrieving (602), through a compiler, a first template file (e.g., ac_set_temperature.py) for a respective actionable intent corresponding to a first task (e.g., set air conditioner temperature) that is to be performed by a machine (e.g., a digital assistant controlling one or more air conditioners); parsing (604) the first template file, using the compiler, to identify a first nonterminal variable (e.g., AC_DEGREE) that refers to a first nonterminal file (e.g., file_AC_DEGREE with a filepath of ./nonterminal/ac_degree.nonterminal) containing a plurality of first named entity values (e.g., temperature values, such as 0, 1, 2, etc.); and generating (606), based on a plurality of production rules (e.g., the statements that links one variable with one or more expressions of that variable in other variable(s) and terminal value(s)) specified in the first template file, including at least a first production rule (e.g., slot_ac_DEGREE→{AC_DEGREE}) that includes the first nonterminal variable (e.g., AC_DEGREE), first context-free grammar (e.g., as shown in upper portion of FIG. 5C, for AC_SET_TEMERATURE) for the respective actionable intent corresponding to the first task, wherein generating the first context-free grammar for the respective actionable intent corresponding to the first task includes rewriting the first production rule (e.g., slot_ac_DEGREE→{AC_DEGREE}) by replacing the first nonterminal variable in the first production rule with the plurality of first named entity values (e.g., slot_ac_DEGREE→ '0'|'1'|'2'| . . . |'32').

In some embodiments, the rewriting of the first production rule is performed during compiling of the first template file performed by the compiler. In some embodiments, the compiler checks for syntax errors (e.g., based on the requirement of the programming language (e.g., python) and based on the requirements for proper context-free grammar) in the first template file when generating the first context-free grammar based on the plurality of production rules specified in the first template file.

In some embodiments, the method further includes: retrieving, through the compiler, a second template file (e.g., fan_set_swingangle.py) for a respective actionable intent corresponding to a second task (e.g., set fan swing angle) that is to be performed by a machine (e.g., the digital assistant that also controls one or more fans), wherein the second template file is distinct from the first template file, and the second task is distinct from the first task; parsing the second template file, using the compiler, to identify a second nonterminal variable (e.g., "FAN_ANGLE") that refers to a second nonterminal file (e.g., file_FAN_ANGLE, with a filepath ./nonterminal/fan_angle.nonterminal) containing a plurality of second named entity values (e.g., fan angle settings that are accepted by the fan), wherein the second nonterminal file is distinct from the first nonterminal file; generating, based on a plurality of production rules specified in the second template file, including at least a second production rule (e.g., slot_ANGLE→{FAN_ANGLE}) that includes the second nonterminal variable, second context-free grammar (e.g., as shown in lower portion of FIG. 5C) for the respective actionable intent corresponding to the second task, wherein generating the second context-free grammar for the respective actionable intent corresponding to the second task includes rewriting the second production rule by replacing the second nonterminal variable in the second production rule with the plurality of second named entity values; and merging the first context-free grammar for the respective actionable intent corresponding to the first task and the second context-free grammar for the respective actionable intent corresponding to the second task into combined context-free grammar (e.g., as shown in FIG. 5C) corresponding to a respective domain including the first task and the second task.

In some embodiments, the method further includes: retrieving, through the compiler, an updated first template file for the respective actionable intent corresponding to the first task, wherein the updated first template file includes at least a first change relative to the first template file (e.g., a change in an existing production rule, an addition of a production rule, a removal of a production rule, etc.); and generating updated first context-free grammar for the respective actionable intent corresponding to the first task by compiling the updated first template file, wherein during the compiling of the updated first template file, the first nonterminal variable in the first production rule in the first template file is replaced with the plurality of first named entity values in the first nonterminal file.

In some embodiments, the method further includes: detecting an update to the first nonterminal file, including an addition of at least one new first named entity value to the plurality of first named entity values in the first nonterminal file; and in accordance with detecting the update to the first nonterminal file, generating updated first context-free grammar for the respective actionable intent corresponding to the first task by recompiling the first template file, wherein during the recompiling of the first template file, the first nonterminal variable in the first production rule is replaced with the plurality of first named entity values, including the at least one new first named entity value, in the updated first nonterminal file.

In some embodiments, the method includes: retrieving, through the compiler, a third template file for a respective actionable intent corresponding to a third task that is to be performed by a machine; parsing the third template file, using the compiler, to identify a third nonterminal variable that refers to a third user-specific nonterminal file for a first registered user and a fourth user-specific nonterminal file for a second registered user; and generating, based on a plurality of production rules specified in the third template file, including a third production rule that includes the third nonterminal variable, first user-specific context-free grammar for the respective actionable intent corresponding to the third task for the first registered user, and second user-specific context-free grammar for the respective actionable intent corresponding to the third task for the second registered user, wherein the first user-specific context-free grammar has the third nonterminal variable replaced with named entity values in the third user-specific nonterminal file for the first registered user, and the second user-specific context-free grammar has the third nonterminal variable replaced with named entity values in the fourth user-specific nonterminal file for the second registered user.

The foregoing description, for purpose of explanation, has been described with reference to specific embodiments. However, the illustrative discussions above are not intended to be exhaustive or to limit the disclosed embodiments to the precise forms disclosed. Many modifications and variations are possible in view of the above teachings. The embodiments were chosen and described in order to best explain the principles and practical applications of the disclosed ideas, to thereby enable others skilled in the art to best utilize them with various modifications as are suited to the particular use contemplated.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A method of generating context-free grammar for intent deduction, comprising:
   at a computing system having one or more processors and memory:
   retrieving, through a compiler, a first template file for a respective actionable intent corresponding to a first task that is to be performed by a machine;
   parsing the first template file, using the compiler, to identify a first nonterminal variable that refers to a first nonterminal file containing a plurality of first named entity values; and
   compiling the first template file, wherein the compiling includes generating, based on a plurality of production rules specified in the first template file, including at least a first production rule that includes the first nonterminal variable, first context-free grammar for the respective actionable intent corresponding to the first task, and wherein generating the first context-free grammar for the respective actionable intent corresponding to the first task includes rewriting the first production rule by replacing the first nonterminal variable in the first production rule with the plurality of first named entity values.

2. The method of claim 1, wherein the compiler checks for syntax errors in the first template file when generating the first context-free grammar based on the plurality of production rules specified in the first template file.

3. The method of claim 1, including:
   retrieving, through the compiler, a second template file for a respective actionable intent corresponding to a second task that is to be performed by a machine, wherein the second template file is distinct from the first template file, and the second task is distinct from the first task;
   parsing the second template file, using the compiler, to identify a second nonterminal variable that refers to a second nonterminal file containing a plurality of second named entity values, wherein the second nonterminal file is distinct from the first nonterminal file;
   generating, based on a plurality of production rules specified in the second template file, including at least a second production rule that includes the second nonterminal variable, second context-free grammar for the respective actionable intent corresponding to the second task, wherein generating the second context-free grammar for the respective actionable intent corresponding to the second task includes rewriting the second production rule by replacing the second nonterminal variable in the second production rule with the plurality of second named entity values; and
   merging the first context-free grammar for the respective actionable intent corresponding to the first task and the second context-free grammar for the respective actionable intent corresponding to the second task into combined context-free grammar corresponding to a respective domain including the first task and the second task.

4. The method of claim 1, including:
   retrieving, through the compiler, an updated first template file for the respective actionable intent corresponding to the first task, wherein the updated first template file includes at least a first change relative to the first template file; and
   generating updated first context-free grammar for the respective actionable intent corresponding to the first task by compiling the updated first template file, wherein during the compiling of the updated first template file, the first nonterminal variable in the first production rule in the first template file is replaced with the plurality of first named entity values in the first nonterminal file.

5. The method of claim 1, including:
   detecting an update to the first nonterminal file, including an addition of at least one new first named entity value to the plurality of first named entity values in the first nonterminal file; and
   in accordance with detecting the update to the first nonterminal file, generating updated first context-free grammar for the respective actionable intent corresponding to the first task by recompiling the first template file, wherein during the recompiling of the first template file, the first nonterminal variable in the first production rule is replaced with the plurality of first named entity values, including the at least one new first named entity value, in the updated first nonterminal file.

6. The method of claim 1, including:
   retrieving, through the compiler, a third template file for a respective actionable intent corresponding to a third task that is to be performed by a machine;

parsing the third template file, using the compiler, to identify a third nonterminal variable that refers to a third user-specific nonterminal file for a first registered user and a fourth user-specific nonterminal file for a second registered user; and generating, based on a plurality of production rules specified in the third template file, including a third production rule that includes the third nonterminal variable, first user-specific context-free grammar for the respective actionable intent corresponding to the third task for the first registered user, and second user-specific context-free grammar for the respective actionable intent corresponding to the third task for the second registered user, wherein the first user-specific context-free grammar has the third nonterminal variable replaced with named entity values in the third user-specific nonterminal file for the first registered user, and the second user-specific context-free grammar has the third nonterminal variable replaced with named entity values in the fourth user-specific nonterminal file for the second registered user.

7. A computing system for generating context-free grammar for intent deduction, comprising:
one or more processors; and
memory storing instructions, the instructions, when executed by the one or more processors, cause the processors to perform operations comprising:
  retrieving, through a compiler, a first template file for a respective actionable intent corresponding to a first task that is to be performed by a machine;
  parsing the first template file, using the compiler, to identify a first nonterminal variable that refers to a first nonterminal file containing a plurality of first named entity values; and
  compiling the first template file, wherein the compiling includes generating, based on a plurality of production rules specified in the first template file, including at least a first production rule that includes the first nonterminal variable, first context-free grammar for the respective actionable intent corresponding to the first task, and wherein generating the first context-free grammar for the respective actionable intent corresponding to the first task includes rewriting the first production rule by replacing the first nonterminal variable in the first production rule with the plurality of first named entity values.

8. The computing system of claim 7, wherein the compiler checks for syntax errors in the first template file when generating the first context-free grammar based on the plurality of production rules specified in the first template file.

9. The computing system of claim 7, wherein the operations include:
retrieving, through the compiler, a second template file for a respective actionable intent corresponding to a second task that is to be performed by a machine, wherein the second template file is distinct from the first template file, and the second task is distinct from the first task;
parsing the second template file, using the compiler, to identify a second nonterminal variable that refers to a second nonterminal file containing a plurality of second named entity values, wherein the second nonterminal file is distinct from the first nonterminal file;
generating, based on a plurality of production rules specified in the second template file, including at least a second production rule that includes the second nonterminal variable, second context-free grammar for the respective actionable intent corresponding to the second task, wherein generating the second context-free grammar for the respective actionable intent corresponding to the second task includes rewriting the second production rule by replacing the second nonterminal variable in the second production rule with the plurality of second named entity values; and
merging the first context-free grammar for the respective actionable intent corresponding to the first task and the second context-free grammar for the respective actionable intent corresponding to the second task into combined context-free grammar corresponding to a respective domain including the first task and the second task.

10. The computing system of claim 7, wherein the operations include:
retrieving, through the compiler, an updated first template file for the respective actionable intent corresponding to the first task, wherein the updated first template file includes at least a first change relative to the first template file; and
generating updated first context-free grammar for the respective actionable intent corresponding to the first task by compiling the updated first template file, wherein during the compiling of the updated first template file, the first nonterminal variable in the first production rule in the first template file is replaced with the plurality of first named entity values in the first nonterminal file.

11. The computing system of claim 7, wherein the operations include:
detecting an update to the first nonterminal file, including an addition of at least one new first named entity value to the plurality of first named entity values in the first nonterminal file; and
in accordance with detecting the update to the first nonterminal file, generating updated first context-free grammar for the respective actionable intent corresponding to the first task by recompiling the first template file, wherein during the recompiling of the first template file, the first nonterminal variable in the first production rule is replaced with the plurality of first named entity values, including the at least one new first named entity value, in the updated first nonterminal file.

12. The computing system of claim 7, wherein the operations include:
retrieving, through the compiler, a third template file for a respective actionable intent corresponding to a third task that is to be performed by a machine;
parsing the third template file, using the compiler, to identify a third nonterminal variable that refers to a third user-specific nonterminal file for a first registered user and a fourth user-specific nonterminal file for a second registered user; and
generating, based on a plurality of production rules specified in the third template file, including a third production rule that includes the third nonterminal variable, first user-specific context-free grammar for the respective actionable intent corresponding to the third task for the first registered user, and second user-specific context-free grammar for the respective actionable intent corresponding to the third task for the second registered user, wherein the first user-specific context-free grammar has the third nonterminal variable replaced with named entity values in the third user-specific nonterminal file for the first registered user, and the second user-specific context-free grammar has the third nonterminal variable replaced with named entity values in the fourth user-specific nonterminal file for the second registered user.

13. A non-transitory computer-readable storage medium for generating context-free grammar for intent deduction, storing instructions, which, when executed by one or more processors, cause the processors to perform operations comprising:
retrieving, through a compiler, a first template file for a respective actionable intent corresponding to a first task that is to be performed by a machine;
parsing the first template file, using the compiler, to identify a first nonterminal variable that refers to a first nonterminal file containing a plurality of first named entity values; and
compiling the first template file, wherein the compiling includes generating, based on a plurality of production rules specified in the first template file, including at least a first production rule that includes the first nonterminal variable, first context-free grammar for the respective actionable intent corresponding to the first task, and wherein generating the first context-free grammar for the respective actionable intent corresponding to the first task includes rewriting the first production rule by replacing the first nonterminal variable in the first production rule with the plurality of first named entity values.

14. The computer-readable storage medium of claim 13, wherein the compiler checks for syntax errors in the first template file when generating the first context-free grammar based on the plurality of production rules specified in the first template file.

15. The computer-readable storage medium of claim 13, wherein the operations include:
retrieving, through the compiler, a second template file for a respective actionable intent corresponding to a second task that is to be performed by a machine, wherein the second template file is distinct from the first template file, and the second task is distinct from the first task;
parsing the second template file, using the compiler, to identify a second nonterminal variable that refers to a second nonterminal file containing a plurality of second named entity values, wherein the second nonterminal file is distinct from the first nonterminal file;
generating, based on a plurality of production rules specified in the second template file, including at least a second production rule that includes the second nonterminal variable, second context-free grammar for the respective actionable intent corresponding to the second task, wherein generating the second context-free grammar for the respective actionable intent corresponding to the second task includes rewriting the second production rule by replacing the second nonterminal variable in the second production rule with the plurality of second named entity values; and
merging the first context-free grammar for the respective actionable intent corresponding to the first task and the second context-free grammar for the respective actionable intent corresponding to the second task into combined context-free grammar corresponding to a respective domain including the first task and the second task.

16. The computer-readable storage medium of claim 13, wherein the operations include:
retrieving, through the compiler, an updated first template file for the respective actionable intent corresponding to the first task, wherein the updated first template file includes at least a first change relative to the first template file; and
generating updated first context-free grammar for the respective actionable intent corresponding to the first task by compiling the updated first template file, wherein during the compiling of the updated first template file, the first nonterminal variable in the first production rule in the first template file is replaced with the plurality of first named entity values in the first nonterminal file.

17. The computer-readable storage medium of claim 13, wherein the operations include:
detecting an update to the first nonterminal file, including an addition of at least one new first named entity value to the plurality of first named entity values in the first nonterminal file; and
in accordance with detecting the update to the first nonterminal file, generating updated first context-free grammar for the respective actionable intent corresponding to the first task by recompiling the first template file, wherein during the recompiling of the first template file, the first nonterminal variable in the first production rule is replaced with the plurality of first named entity values, including the at least one new first named entity value, in the updated first nonterminal file.

\* \* \* \* \*